US011760008B2

(12) United States Patent
Nelson et al.

(10) Patent No.: US 11,760,008 B2
(45) Date of Patent: Sep. 19, 2023

(54) ADDITIVE PROCESSING OF FLUOROPOLYMERS

(71) Applicant: 3M INNOVATIVE PROPERTIES COMPANY, St. Paul, MN (US)

(72) Inventors: Per Miles Nelson, Woodbury, MN (US); Jeffrey N. Bartow, West Saint Paul, MN (US); Fee Zentis, Waging am See (DE); Klaus Hintzer, Kastl (DE); Gabriele H. Gottschalk-Gaudig, Mehring (DE)

(73) Assignee: 3M Innovative Properties Company, St. Paul, MN (US)

( * ) Notice: Subject to any disclaimer, the term of this patent is extended or adjusted under 35 U.S.C. 154(b) by 741 days.

(21) Appl. No.: 16/631,795

(22) PCT Filed: Jul. 18, 2018

(86) PCT No.: PCT/IB2018/055356
§ 371 (c)(1),
(2) Date: Jan. 16, 2020

(87) PCT Pub. No.: WO2019/016739
PCT Pub. Date: Jan. 24, 2019

(65) Prior Publication Data
US 2020/0180220 A1 Jun. 11, 2020

Related U.S. Application Data
(60) Provisional application No. 62/534,459, filed on Jul. 19, 2017.

(51) Int. Cl.
| | | |
|---|---|---|
| *C08J 9/28* | (2006.01) | |
| *B29C 64/165* | (2017.01) | |
| *B33Y 70/00* | (2020.01) | |
| B33Y 80/00 | (2015.01) | |
| B33Y 70/10 | (2020.01) | |
| B29K 27/00 | (2006.01) | |
| B29K 27/18 | (2006.01) | |

(52) U.S. Cl.
CPC ............ *B29C 64/165* (2017.08); *B33Y 70/00* (2014.12); *C08J 9/286* (2013.01); *B29K 2027/14* (2013.01); *B29K 2027/18* (2013.01); *B33Y 70/10* (2020.01); *B33Y 80/00* (2014.12); *C08J 2201/046* (2013.01); *C08J 2207/10* (2013.01); *C08J 2327/14* (2013.01); *C08J 2327/18* (2013.01)

(58) Field of Classification Search
CPC .................................................. B29C 64/165
See application file for complete search history.

(56) References Cited

U.S. PATENT DOCUMENTS

| | | |
|---|---|---|
| 2,965,595 A | 12/1960 | Brinker |
| 3,855,191 A | 12/1974 | Doughty, Jr. |
| 4,120,608 A | 10/1978 | Vassiliou |
| 4,197,234 A * | 4/1980 | Temin .................... C08K 3/013 524/502 |
| 4,349,650 A | 9/1982 | Krespan |
| 4,605,773 A | 8/1986 | Maloney |
| 5,229,480 A | 7/1993 | Uschold |
| 5,688,884 A | 11/1997 | Baker |
| 5,700,859 A | 12/1997 | Ogura |
| 5,763,552 A | 6/1998 | Feiring |
| 5,895,799 A | 4/1999 | Wu |
| 6,025,307 A | 2/2000 | Chittofrati |
| 6,103,843 A | 8/2000 | Abusleme |
| 6,126,849 A | 10/2000 | Yamana |
| 6,486,078 B1 | 11/2002 | Rangarajan et al. |
| 7,596,273 B2 | 9/2009 | Aoyama |
| 8,097,673 B2 | 1/2012 | Jones |
| 10,759,707 B2 * | 9/2020 | Mayr .................... A61K 6/822 |
| 2010/0143870 A1* | 6/2010 | Kahdemann .......... A61C 8/0012 433/174 |
| 2015/0080495 A1* | 3/2015 | Heikkila ................ B22F 3/004 264/642 |
| 2015/0190545 A1 | 7/2015 | Oral |
| 2017/0174932 A1 | 6/2017 | Granlund |
| 2017/0326038 A1* | 11/2017 | Maurer .................... A61K 6/90 |

FOREIGN PATENT DOCUMENTS

| | | |
|---|---|---|
| CN | 102070793 | 5/2011 |
| CN | 104816478 | 8/2015 |
| CN | 103709737 | 3/2016 |
| CN | 105524236 A | 4/2016 |
| CN | 105711104 | 6/2016 |
| EP | 0086397 | 8/1983 |
| EP | 0712882 | 5/1996 |
| EP | 0752432 | 1/1997 |
| EP | 0969027 | 1/2000 |

(Continued)

OTHER PUBLICATIONS

WO2016-099987 (Year: 2016).*
Bommel, "Drying of Silica Gels, with Supercritical Carbon Dioxide", Journal of Materials Science, 1994, vol. 29, pp. 943-948.
Francis, "Ternary Systems of Liquid Carbon Dioxide", The Journal of Physical Chemistry, 1954, vol. 58, No. 12, pp. 1099-1114.
Hintzer, Fluoropolymers Organic, Ullmann's Encyclopedia of Chemistry, 35-38 (2013).
McHugh, Supercritical Fluid Extraction: Principles and Practice. 10 pages (1986).
Scheirs, Modern Fluoropolymers High 6 pages (1997).

(Continued)

*Primary Examiner* — Irina Krylova
(74) *Attorney, Agent, or Firm* — Adrian L. Pishko; Thomas M. Spielbauer

(57) ABSTRACT

Provided are methods for making shaped fluoropolymer by additive processing using fluoropolymer particles, polymerizable binder and extraction with supercritical fluids. Also provided are 3D printable compositions for making shaped fluoropolymer articles and articles comprising a shaped fluoropolymer.

12 Claims, No Drawings

(56) References Cited

FOREIGN PATENT DOCUMENTS

| EP | 1059342 | 12/2000 |
|---|---|---|
| EP | 1533325 | 5/2005 |
| EP | 1661922 | 5/2006 |
| JP | H 10226728 | 8/1998 |
| WO | WO 2000-022002 | 4/2000 |
| WO | WO 2000-071590 | 11/2000 |
| WO | WO 2001-046107 | 6/2001 |
| WO | WO 2003-051988 | 6/2003 |
| WO | WO 2007-133912 | 11/2007 |
| WO | WO 2008-140914 | 11/2008 |
| WO | WO 2011-014715 | 2/2011 |
| WO | WO 2011-139807 | 11/2011 |
| WO | WO2016191162 | * 12/2016 |
| WO | WO 2017-127561 | 7/2017 |
| WO | WO 2017-127569 | 7/2017 |
| WO | WO 2017-127572 | 7/2017 |
| WO | WO 2018-118956 | 6/2018 |

OTHER PUBLICATIONS

Wendel, "Additive Processing of Polymers", Macromolecular Materials Engineering, 2008, vol. 293, No. 10, pp. 799-809.

Yang, "3D Printing Apparatus and Method with use of Supercritical Carbon Dioxide as Solvent", Database—Chemical Abstract Service, 2 pages.

International Search Report for PCT International Application No. PCT/IB2018/055356 dated Feb. 27, 2019, 7 pages.

\* cited by examiner

US 11,760,008 B2

ADDITIVE PROCESSING OF FLUOROPOLYMERS

CROSS REFERENCE TO RELATED APPLICATIONS

This application is a national stage filing under 35 U.S.C. 371 of PCT/IB2018/055356, filed Jul. 18, 2018, which claims the benefit of Provisional Application No. 62/534,459, filed Jul. 19, 2017, the disclosure of which is incorporated by reference in their entirety herein.

FIELD

The present disclosure relates to additive processing of fluoropolymers and to fluoropolymer articles obtained by additive processing.

BACKGROUND

Fluoropolymers are widely used as raw materials for their chemical inertness, in particular for articles requiring low friction properties and/or inertness to chemicals and heat. Perfluorinated polymers are particularly inert.

Fluoropolymers are typically classified into thermoplastics and elastomers (sometimes also referred to as fluororubbers).

Fluorothermoplastics can be processed by conventional melt shaping methods, such as injection molding and extrusion. Fluorothermoplastics typically are copolymers of tetrafluoroethylene (TFE) with one or more other perfluorinated, partially fluorinated or non-fluorinated comonomers. Copolymers of TFE and perfluorinated alkyl or allyl ethers are known in the art as PFA's (perfluorinated alkoxy polymers). Copolymers of TFE and hexafluoropropylene (HFP) with or without other perfluorinated comonomers are known in the art as FEP's (fluorinated ethylene propylene). Copolymers of TFE, HFP and vinylidenefluoride (VDF) are known in the art as THV. Other types of melt-processable fluoropolymers are based on vinylidenefluoride homo- or copolymers, known in the art as PVDF. Copolymers of TFE and ethylene are known as ETFE.

Certain types of thermoplastics have a very high melt viscosity (low melt flow index (MFI) and are termed in the art as "non-melt processable". Non-melt processable fluoropolymers include homopolymers of TFE or copolymers of TFE with other copolymerizable perfluorinated monomers, wherein the amount of comonomers is limited to less than 1% wt. Such TFE homo- and copolymers are referred to in the art as PTFE. PTFE and other comonomers of tetrafluoroethylene with a comparable high melt viscosity (low melt flow rate) cannot be shaped by conventional melt processing techniques such as extrusion, injection molding or blow molding. PTFE articles typically are formed by ram extrusion, or by press-sintering PTFE particles into billets that are then machined into the desired shape. These are subtractive methods where material is removed to shape articles.

In WO2007/133912 A2 and U.S. Pat. No. 7,596,273 B2 an additive manufacturing process for thermoplastic polymers are described. Some fluoropolymers such as PVDF and PCTF are described but examples for these polymers are not provided. In CN103709737 A and CN 105711104 A methods for 3D printing by selective laser sintering are described where the use of PTFE is mentioned. Experimental details as to the printing conditions and properties of printed examples appear not to be provided.

There is a need for providing alternative methods of processing fluoropolymers by additive processing and in particular there is a need for processing fluoropolymers having a low melt flow rate. There is also a need for providing fluoropolymer articles with new properties.

SUMMARY

In one aspect there is provided a method of producing a fluoropolymer article comprising
(i) subjecting a composition comprising fluoropolymer particles either dispersed in a dispersing medium or dissolved in a solvent to additive processing in an additive processing device containing at least one energy source wherein the composition comprises at least one polymerizable binder material capable of binding the fluoropolymer particles to form a layer in a part of the composition that has been exposed to the energy source of the additive processing device;
(ii) subjecting at least a part of the composition to exposure of the energy source to form a layer by polymerizing the binder material;
(iii) repeat step (ii) to form a plurality of layers to create an article;
(iv); at least partially removing the solvent or the dispersing medium from the article by treatment with a supercritical fluid.

In another aspect there is provided a method of producing a fluoropolymer article comprising
(i) providing a fluoropolymer article comprising fluoropolymer and one or more binder materials, wherein the article comprises less than 20% by weight based on the total weight of the article of solvent and/or water;
(ii) subjecting the article to a heat treatment to remove or decompose the binder material.

In yet another aspect there is provided a method of producing a fluoropolymer article comprising
(i) providing a fluoropolymer article containing fluoropolymer, binder material, solvent and/or water;
(ii) at least partially removing the solvent or the dispersing medium from the article by treatment with a supercritical fluid.

In a further aspect there is provided an article comprising a curved surface wherein the curved surface comprises a fluoropolymer and has a surface roughness (Ra) of less than 8 μm, preferably less than 6 μm and more preferably less than 5.5 μm and wherein the fluoropolymer is selected from the group consisting of tetrafluoroethylene homopolymers, tetrafluoroethylene copolymers containing up to 1% by weight of perfluorinated alpha-olefin comonomers, and tetrafluoroethylene copolymers containing more than 1% by weight and up to 30% by weight based on the weight of the polymer of perfluorinated comonomers, partially fluorinated comonomers and non-fluorinated comonomers.

In another aspect there is provided an article comprising a shaped composition comprising fluoropolymer, binder material and wherein the composition has a density of less than 2.00 g/cm$^3$ and wherein the article contains one or more interior walls.

DETAILED DESCRIPTION

Before any embodiments of this disclosure are explained in detail, it is to be understood that the disclosure is not limited in its application to the details of construction and the arrangement of components set forth in the following description. Also, it is to be understood that the phraseology and terminology used herein is for the purpose of description. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein describing a physical parameter or amounts and concentration of ingredients is intended to include all values from the lower value to the upper value of that range and including its endpoints. For example, a concentration range of from 1% to 50% is intended to be an abbreviation and to expressly disclose the values between the 1% and 50%, such as, for example, 2%, 40%, 10%, 30%, 1.5%, 3.9% and so forth.

All references cited herein are incorporated by reference unless stated otherwise.

Unless specified otherwise, cited norms (e.g. DIN, ASTM, ISO etc) are the versions in force in Jan. 1, 2016. In case a norm had expired before Jan. 1, 2016 the most recent active version is referred to herein.

Amounts of ingredients expressed by weight percentages (% wt, % by weight, wt %) are based on the total weight of the composition unless stated otherwise. The total weight of the composition corresponds to 100% by weight.

3D-printed fluoropolymers and fluoropolymer articles can be prepared by additive processing of compositions comprising fluoropolymer particles and a binder material that is capable of binding the fluoropolymer particles into a volume element upon exposure to an energy source, typically that of the additive processing device. Although referred to herein as "binder" material, no formation of a chemical bond (e.g., to the fluoropolymer material) has to occur. The interaction may be physical or chemical or both, but should be sufficient to keep the fluoropolymer particles in a defined position by the polymerized binder material.

Fluoropolymer-containing layers may be created successively to form a three-dimensional article. After the creation of the article in the additive processing device, the binder material may be removed. After removal of the binder material or parallel to the removal of the binder material, the article may be subjected to sintering.

An advantage of the methods and compositions provided herein is that not only prototypes of fluoropolymer articles can be produced at low costs, but also that fluoropolymer articles of complex shape and design may be created that may not be available through conventional fluoropolymer processing or only at higher costs.

Another advantage of the methods and compositions provided herein is that shaped fluoropolymers, in particular PTFE, may be prepared without applying increased pressure and forces. Therefore, a shaped fluoropolymers and articles can be prepared that are more isotropic, for example shaped fluoropolymers may be created having a low degree of orientation.

Despite using a binder material, the shaped fluoropolymers, in particular PTFE, may have a high density and/or a low void content.

Another advantage of the methods and compositions provided herein is that fluoropolymer articles, in particular PTFE articles, can be prepared that are of small dimension and have complex structures.

A further advantage of the present methods and compositions is that integral fluoropolymer articles, in particular PTFE articles, of complex structure can be prepared.

The methods provided herein allow for the creation of shaped fluoropolymers and fluoropolymer articles having a very smooth surface.

Yet a further advantage of the methods provided herein is that these methods are less wasteful than prior art methods of "sculpting" blocks of material, because in the present methods, there is less (for instance, if articles are printed to so-called "near net shape" and then sculpted to a final form) or even no wasted material (for instance, if final shapes are directly formed) to sculpt away from the final shaped article, and unreacted 3D printable compositions may be reused in a next 3D print run.

Another advantage of the present methods is that the degree of porosity of the fluoropolymer article, in particular PTFE articles, can be controlled to create article of low or high porosity.

Additive Processing

Additive processing, also known as "3D printing," or "additive manufacturing (AM)," refers to a process to create a three-dimensional object typically by sequential deposition of materials in defined areas, typically by generating successive layers of material. The object is typically produced under computer control from a 3D model or other electronic data source by an additive printing device typically referred to as a 3D printer. The term "3D printer" and "additive processing device" are used herein interchangeably and generally refer to a device by which additive processing can be carried out. The terms "3D-printing" and "3D-printable" are used likewise and mean additive processing and suitable for additive processing.

Additive processing devices are devices by which sequential deposition of material in defined areas can be achieved, typically by deposition of volume elements, such as layers. Successive layers are built up, layer-on-layer, to create a three-dimensional object. Typically, the device is computer-controlled. Further typically, the device creates the object based on an electronic image (blueprint) of the object to be created. The 3D printer contains an energy source that applies energy to a localised area in a 3D-printable composition. The energy applied may be, for example, heat or irradiation or both. The energy source may include a light source, for instance a light source emitting non-visible light, e.g., ultraviolet light (UV light), a laser, e-beam generators, microwave generator and other sourcing capable of focussing energy to defined areas of the 3D-printable composition. The energy source may be moved to defined areas over the surface of the 3D printable composition, or the printable composition may be moved in a defined way towards and away from the energy source, typically all under computer control.

One or even several energy sources may be used, arranged at different positions in the additive processing device. Typically, the additive printing device contains a platform onto which the printable material is provided. The platform, for example, can be moved towards the energy source or away from it, typically, by the distance of the layers to be formed on the platform. Typically this is also done under computer control. The device may further contain a device such as a wiper blade or an injection nozzle by which new printable material is provided and can be applied over the layer formed for successive layer-on-layer building. Support structures may be used and later removed in case the object to be created is complex or requires structural support during its creation. Additive printing devices as known and that are commercially available can be used for the methods provided herein.

According to the present disclosure, the volume elements or layers are formed by using a 3D printable composition containing fluoropolymer particles and a binder material. Exposure of the composition to the energy source of the device, or more precisely, to the energy emitted from the energy source, causes the polymerizable binder material to polymerize. Typically, the binder material's viscosity increases in the areas exposed to the energy source through polymerization which keeps the embedded fluoropolymer particles in a defined position.

A typical example of this type of additive manufacturing technique is known in the art as 'stereolithography' (SL) or 'vat polymerization'(VP) although other 3D printing methods may be used. This type of additive manufacturing process works by focussing electromagnetic irradiation (including, for example UV light) on to a vat of 3D printable composition containing polymerizable material. The 3D printable composition is typically a liquid. With the help of computer aided manufacturing or computer aided design software (CAM/CAD), the irradiation is used to draw a pre-programmed design or shape on to the surface of the 3D-printable composition. Because the 3D-printable composition is reactive to the irradiation, the composition becomes more viscous, solidified or gels and forms a single layer of the desired 3D object on the areas exposed to the irradiation. This process is repeated for each layer of the design until the 3D object is complete. Typically, the 3D printer used for stereolithography contains an elevator platform that descends a distance equal to the thickness of a single layer of the design (typically 0.05 mm to 0.15 mm, or 0.001 mm to 0.15 mm) into the vat containing the 3D printable composition before a new layer is formed by irradiation. A blade filled with new printable material may sweep across a cross section of the layer, re-coating it with fresh material. Alternatively a nozzle may be used or other devices of providing new printable material. The subsequent layer is traced, joining the previous layer. A complete 3D object can be formed using this process. Depending on the design of the additive processing device another typical method raises or lowers the build platform further than one layer or volume element so that the printable material is able to flow easily over the previous layer/volume element. Upon returning to the desired step height the previous layer is uniformly covered. The subsequent is traced joining the previous layer.

Although described in greater detail for stereolithography, the 3D printable compositions may be used in other 3D printing methods as well. For example, 3D printable compositions according to the present disclosure that are viscous compositions or extrudable pastes can be processed by extruding the composition through an extruder on the selected location of a build platform. The energy source may be placed on the exit of the extruder or elsewhere and the material extruded on the platform is irradiated at the selected location to cause the binder material to polymerize and to form a volume element. This step may be repeated until an object is formed.

Preferably, irradiation with light (preferably UV light) is used and the polymerizable binder material used in the 3D printable composition is reactive to light, or UV light, or is reactive to initiators that are activated by light or UV light as the case may be. However, irradiation with other wavelengths may also be used, for example from the visible or invisible light (e.g. IR) and including X-rays and e-beams. In that case a polymerizable material is chosen that is reactive to such irradiation or that is reactive to polymerization initiators that are activated by such irradiation.

Conditions for effective irradiation may vary depending on the type of irradiation used and the type of polymerizable materials chosen. Polymerizable materials and polymerization initiators may be selected that are responsive to various types of irradiation for example to irradiation with visible or invisible lights. For example irradiation with light of wavelengths from 1 to 10,000 nm, for example but not limited to 10 to 1,000 nm may be used. The irradiation may be monochromatic or polychromatic depending on the reactivity of the polymerizable system chosen.

UV irradiation typically includes irradiation with a wavelength between 10 and 410 nm. UV irradiation may be generated from a UV source, like a laser, a mercury lamp or UV LEDs. UV LEDs (light emitting diodes, LED) are commercially available that produce monochromatic irradiation at wave length of 365 nm, 385 nm and 405 nm within an error margin of +/−10 nm.

Infrared irradiation typically includes irradiation with electromagnetic waves of a wave length from 1 mm to 750 nm. Irradiation with visible light typically includes irradiation with a wave length between 410 and 760 nm.

Depending on the complexity of the article design supporting structures may be attached to the elevator platform to prevent deflection or delamination due to gravity and to hold cross sections in place in order to resist lateral pressure from the resin-filled blade.

The methods provided herein can be carried out in known and commercially available additive printing devices, for example known devises for stereolithography or vat polymerization. Typical known methods and their 3D printers have been described, for example, in "Additive Processing of Polymers" by B. Wendel et al in *Macromol. Matter. Eng.* 2008, 293, 799-809. Examples of commercially available 3D printers include, but are not limited to 3D printers from ASIGA, Anaheim, California, USA for vat polymerization printing. However, also other 3D printing methods may be used. For example the 3D-printable compositions may be extruded as pastes through one or more nozzles and subjected to the energy source upon which the binder polymerizes. Examples include printers from Hyrel 3D, Norcross, GA 30071, such as Hyrel System 30M printer with extrusion heads. In such printers the 3D-printable compositions are adjusted by their compositions to have the required viscosity, for example by increasing the polymer content.

3D-Printable Compositions

The compositions provided in the present disclosure are suitable for additive processing and are also referred to herein as "3D-printable compositions." They comprise one or more fluoropolymer and one or more binder material. The binder material typically comprises one or more polymerizable materials. The 3D-printable compositions may be dispersions of fluoropolymer particles in a liquid medium, or in the polymerizable binder material or both. The compositions are preferably liquid compositions, more preferably aqueous compositions but can also be extrudable compositions, such as pastes. The compositions and their ingredients will be described in greater detail below.

Fluoropolymers

The 3D-printable compositions of the present disclosure contain fluoropolymers. Suitable fluoropolymers include homopolymers of tetrafluoroethylene and copolymers of tetrafluoroethylene with one or more perfluorinated comonomers, partially fluorinated or non-fluorinated comonomers. Perfluorinated comonomers include perfluorinated alpha olefins and perfluorinated alpha olefin ethers, i.e. olefins where the carbon-carbon double bond is in a terminal position.

Perfluorinated alpha olefins include compounds according to the formula:

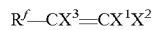

wherein $X^1$, $X^2$, $X^3$ are either all F or two of $X^1$, $X^2$ and $X^3$ are F and one is Cl. $R^f$ is a linear or branched alkyl radical of 1-12 carbon atoms and of which all hydrogen atoms have been replaced by fluorine atoms. Examples include hexafluoropropylene (HFP) and, chlorotrifluoroethylene (CTFE).

Examples of perfluorinated alpha olefin include ethers of the formula $$R^f-O-(CF_2)_n-CF=CF_2,$$

wherein n represents 1, in which case the compounds are referred to as allyl ethers, or 0, in which case the compounds are referred to as vinyl ethers. $R^f$ represents a linear or branched, cyclic or acyclic perfluorinated alkyl residue containing at least one catenary oxygen atom (in the context of this application, unless specified otherwise or implied by otherwise by the context, catenary atom means an ether-oxygen atom). $R^f$ may contain up to 8, preferably, or up to 6 carbon atoms, such as 1, 2, 3, 4, 5 and 6 carbon atoms. Typical examples of $R^f$ include linear or branched alkyl residues interrupted by one oxygen atom, and linear or branched alkyl residues containing 2, 3, 4 or 5 catenary ether oxygens. Further examples of $R^f$ include residues containing one or more of the following units and combinations thereof: $-(CF_2O)-$, $-(CF_2CF_2-O)-$, $(-O-CF_2)-$, $-(O-CF_2CF_2)-$, $-CF(CF_3)-$, $-CF(CF_2CF_3)-$, $-O-CF(CF_3)-$, $-O-CF(CF_2CF_3)-$, $-CF(CF_3)-O-$, $-CF(CF_2CF_3)-O-$.

Further examples of $R^f$ include but are not limited to:
$-(CF_2)_{r1}-O-C_3F_7$,
$-(CF_2)_{r2}-O-C_2F_5$,
$-(CF_2)_{r3}-O-CF_3$,
$-(CF_2-O)_{s1}-C_3F_7$,
$-(CF_2-O)_{s2}-C_2F_5$,
$-(CF_2-O)_{s3}-CF_3$,
$-(CF_2CF_2-O)_{t1}-C_3F_7$,
$-(CF_2CF_2-O)_{t2}-C_2F_5$,
$-(CF_2CF_2-O)_{t3}-CF_3$,
wherein r1 and s1 represent 1, 2, 3, 4, or 5, r2 and s2 represent 1, 2, 3, 4, 5 or 6, r3 and s3 represent 1, 2, 3, 4, 5, 6 or 7; t1 represents 1 or 2; t2 and t3 represent 1, 2 or 3.

Specific examples of suitable perfluorinated alkyl vinyl ether comonomers include
$F_2C=CF-O-CF_3$
$F_2C=CF-O-C_2F_5$
$F_2C=CF-O-C_3F_7$
$F_2C=CF-O-CF_2-O-(CF_2)-F$,
$F_2C=CF-O-CF_2-O-(CF_2)_2-F$,
$F_2C=CF-O-CF_2-O-(CF_2)_3-F$,
$F_2C=CF-O-CF_2-O-(CF_2)_4-F$,
$F_2C=CF-O-(CF_2)_2-OCF_3$,
$F_2C=CF-O-(CF_2)_3-OCF_3$,
$F_2C=CF-O-(CF_2)_4-OCF_3$,
$F_2C=CF-O-(CF_2)_3-(OCF_2)_2-F$,
$F_2C=CF-O-CF_2-(OCF_2)_3-CF_3$,
$F_2C=CF-O-CF_2-(OCF_2)_4-CF_3$,
$F_2C=CF-O-(CF_2O)_2-OCF_3$,
$F_2C=CF-O-(CF_2O)_3-OCF_3$,
$F_2C=CF-O-(CF_2O)_4-OCF_3$.

Specific examples of suitable perfluorinated alkyl allyl ether comonomers include:
$F_2C=CF-CF_2-O-CF_3$
$F_2C=CF-CF_2-O-C_2F_5$
$F_2C=CF-CF_2-O-C_3F_7$
$F_2C=CF-CF_2-O-CF_2-O-(CF_2)-F$,
$F_2C=CF-CF_2-O-CF_2-O-(CF_2)_2-F$,
$F_2C=CF-CF_2-O-CF_2-O-(CF_2)_3-F$,
$F_2C=CF-CF_2-O-CF_2-O-(CF_2)_4-F$,
$F_2C=CF-CF_2-O-(CF_2)_2-OCF_3$,
$F_2C=CF-CF_2-O-(CF_2)_3-OCF_3$,
$F_2C=CF-CF_2-O-(CF_2)_4-OCF_3$,
$F_2C=CF-CF_2-O-(CF_2)_3-(OCF_2)_2-F$,
$F_2C=CF-CF_2-O-CF_2-(OCF_2)_3-CF_3$,
$F_2C=CF-CF_2-O-CF_2-(OCF_2)_4-CF_3$,
$F_2C=CF-CF_2-O-(CF_2O)_2-O-CF_3$,
$F_2C=CF-CF_2-O-(CF_2O)_3-OCF_3$,
$F_2C=CF-CF_2-O-(CF_2O)_4-OCF_3$.

Particular examples of perfluorinated alkyl allyl ether include unsaturated ethers according to the general formula:

$$CF_2=CF-CF_2-OR^f$$

wherein $R^f$ represents a linear or branched, cyclic or acyclic perfluorinated alkyl residue. $R^f$ may contain up to 10 carbon atoms, e.g. 1, 2, 3, 4, 5, 6, 7, 8, 9 or 10 carbon atoms. Preferably $R^f$ contains up to 8, more preferably up to 6 carbon atoms and most preferably 3 or 4 carbon atoms. $R^f$ may be linear, branched and it may contain or not contain a cyclic unit. Specific examples of $R^f$ include perfluoromethyl ($CF_3$), perfluoroethyl ($C_2F_5$), perfluoropropyl ($C_3F_7$) and perfluorobutyl ($C_4F_9$), preferably $C_2F_5$, $C_3F_7$ or $C_4F_9$. In a particular embodiment $R^f$ is linear and is selected from $C_3F_7$ or $C_4F_9$.

Perfluorinated alkyl allyl ethers and alkyl vinyl ethers as described above are either commercially available, for example from Anles Ltd. St. Peterburg, Russia or can be prepared according to methods described in U.S. Pat. No. 4,349,650 (Krespan) or international patent application no. WO 01/46107 (Worm et al) or in Modern Fluoropolymers, J. Scheirs, Wiley 1997 and the references cited therein or by modifications thereof as known to the skilled person.

In addition to using one comonomer with TFE, the present description also contemplates the use more than one comonomer including a combination of the above comonomers.

The fluoropolymers may contain more than 50% by weight (based on the fluoropolymer) of units derived from TFE. Preferably, the fluoropolymer contains more than 70% by weight of TFE and more preferably more than 80% by weight. The comonomer content of fluoropolymers may be up to 50% by weight, preferably up to 30% by weight and more preferably less than 20% by weight. Preferably, the comonomers are perfluorinated comonomers. In some embodiments, the comonomers may include partially fluorinated or non-fluorinated comonomers.

Preferably the fluoropolymers are perfluorinated and only contain units derived from perfluorinated comomonomers, i.e. they contain 0% by weight of comonomers other than the perfluorinated comonomers. In one embodiment the polymers contain less than 2% by weight, preferably less than 1% by weight of copolymers other than the perfluorinated comonomers.

In a preferred embodiment the fluoropolymer is a homopolymer of TFE or a copolymer of TFE and one or more perfluorinated comonomers, preferably selected from HFP, CTFE, one or more perfluoroalkyl vinyl ether or one or more perfluoro alkyl allyl ether or combinations thereof. In one embodiment the amount of the perfluorinated comonomers may be up to 12% by weight based on the total weight of the fluoropolymer, preferably up to 1% or more preferably up to 0.1% by weight. Preferably the copolymer is perfluorinated (i.e. it does not contain any comonomers other than perfluorinated comonomers).

In one embodiment the fluoropolymer contains TFE, HFP and/or one or more perfluoroalkyl vinyl ether (PAVE)

comonomer and no other comonomer. In another embodiment the fluoropolymer contains TFE, HFP and/or one or more perfluoroalkyl allyl ether (PAAE) comonomer and no other comonomer. In yet another embodiment the fluoropolymer contains TFE and HFP and/or a combination of PAVE and PAAE comonomers and no other comonomers.

In one embodiment the fluoropolymer contains TFE and no comonomers or the amount of the comonomers is up to 2 wt % or up to 1 wt % or up to 0.1 wt %. Typical amounts include, for example, from about 0.1 to 2, or from 0.1 to 1 percent by weight or from 0.3 to 1 percent by weight (all based on the total weight of the polymer). Typical comonomers include perfluorinated comonomers, preferably comonomers selected from HFP, perfluoro alkyl vinyl ethers, perfluoro alkyl allyl ethers and combinations thereof. Such polymers are typically not melt-processable.

In one embodiment the fluoropolymer is PTFE, i.e. a TFE homopolymer or a TFE copolymer containing up to 1% by weight of copolymers wherein the copolymers are perfluorinated comonomers as described above.

In one embodiment of the present disclosure the fluoropolymers is a non-melt processable fluoropolymer. Non-melt processable fluoropolymers have a melt flow index (MFI) of 1.0 g/10 min or less at 372° C. using a 5 kg load (MFI 372/5 of less than 1.0 g/10 min), preferably a melt flow index (372/5) of 0.1 g/10 minutes or less. Fluoropolymers with a melt flow index (MFI) of 1.0 g/10 min or less at 372° C. using a 5 kg load (MFI 372/5 of less than 1.0 g/10 min), preferably a melt flow index (372/5) of 0.1 g/10 minutes or less, have such a high melt viscosity that they retain their shape despite being at a temperature above their melting points. This is advantageous for removing binder material by heat treatment and to provide dense fluoropolymer articles.

However, also melt-processable fluoropolymers, i.e. fluoropolymers with a higher MFI may be processed with the methods provided herein and 3D printed articles may be created from melt-processable fluoropolymers. In case of the melt-processable fluoropolymers, the heat treatment may have to be adjusted and chosen such that the melt-processable fluoropolymers do not melt such that the shape of the article may be affected. The melt-processable fluorothermoplasts have a melt flow index of greater than 1.0 g/10 min (MFI (372° C./5 kg)). Preferably, they have an (MFI (372° C./5 kg) from 1.1 to 50 g/10 min, more preferably from 1 to 20 or 1 to 5 g/10 minutes.

In one embodiment the fluoropolymer is a "melt processable" fluoropolymer. Such fluoropolymers are also copolymers of TFE. The same comonomers and combinations of comonomers as described above can be used. Melt-processable fluoropolymers include copolymers of TFE with perfluorinated, partially fluorinated or non-fluorinated comonomers, wherein the comonomer content is greater than 1% wt, or greater than 3% by weight and may be up to 30% wt (as used hereinabove and below the weight percentages are based on the total weight of the polymer—unless specified otherwise).

Examples of non-fluorinated comonomers include ethylene and propylene. Examples of partially fluorinated comonomers include alpha olefins containing fluorine atoms and hydrogens atoms. Examples include but are not limited to vinyl idene fluoride, vinyl fluoride and fluorinated alkyl vinyl and fluorinated alkyl allyl ether with hydrogen atoms in the alkyl chain and/or at the carbon-carbon double bond. Melt-processable fluoropolymers (also referred to as "thermoplasts" or "thermoplastics") include but are not limited to: FEP (copolymers of TFE, HFP and other optional amounts of perfluorinated vinyl ethers); THV (copolymers of TFE, VDF and HFP), PFA (copolymers of TFE and perfluoro alkyl vinyl ethers and/or perfluoro alkyl allyl ethers) homonomers and copolymers of VDF (PVDF) and homo- and copolymers of chlortrifluoroethylene (CTFE) and copolymers of TFE and ethylene (ETFE).

Preferred melt-processable fluorothermoplasts include fluoropolymers with a melting point between 260 and 315° C., preferably 280° C. to 315° C.

In one embodiment the melt processable fluorothermoplasts are PFAs. PFAs are copolymers of TFE and at least one perfluoro alkyl vinyl ethers (PAVE's), perfluoro alkyl allyl ethers (PAAE) and combinations thereof. Typical amounts of copolymers range from 1.7% to 10% wt. Preferably, the PFAs have a melting point between 280° C. and 315° C., for example between 280° C. and 300° C.

In one embodiment the fluoropolymer is melt-processable and has an MFI greater than 50 g/10 min (MFI 372/5). In one embodiment, fluorothermoplasts with MFI's greater than 50 g/10 min (MFI 372/5) and/or with melting points below 300° C. or 280° C., or below 200° C. may be used, for example fluorothermoplasts with melting points between 150° C. and 280° C. These fluoropolymers require a milder heat treatment in the work-up procedure to avoid structural stability. The binder material may be removed not thermally but, for example, by solvent extraction, or binder material may be chosen that can be removed at low temperatures. Such materials may also preferably be processed as pastes and the 3D printable compositions may contain no water or only low amounts of water. This would avoid or reduce the heat treatment necessary to remove residual water in the work-up procedure.

In one embodiment of the present disclosure the fluoropolymers have a standard specific gravity (SSG) of between 2.13 and 2.23 g/cm$^3$ as measured according to ASTM 4895. The SSG is a measure for the molecular weight of the polymer. The higher the SSG, the lower the molecular weight. In one embodiment ultra-high molecular weight PTFEs are used in the present disclosure, which means PTFE polymers having an SSG of less than 2.17 g/cm$^3$, for example an SSG of between 2.14 and 2.16. Such PTFE polymers and their preparation is described, for example, in WO2011/139807.

In one embodiment, the fluoropolymers of the present disclosure have a melting point of at least 300° C., preferably at least 315° C. and typically within the range of 327+/−10° C. In some embodiments, the fluoropolymers have a melting point of at least 317° C., preferably at least 319° C. and more preferably at least 321° C. In a preferred embodiment, the fluoropolymer with such melting point is not melt-processable.

The fluoropolymers may have different polymer architectures and can be, for example core-shell polymers, random polymers or polymers prepared under continuous and constant polymerization conditions. The fluorothermoplasts may be linear or branched, for example in case they contain branched comonomers like HFP. Longer branches may be created by using branching modifiers in the polymerization as described, for example in WO2008/140914 A1.

Fluoropolymers as commercially available may be used. Fluorothermoplasts are described, for example, in "Fluoropolymer, Organic" in Ullmann's Encyclopedia of industrial chemisty, 7$^{th}$ edition, 2013, Wiley-VCH Verlag Chemie, Weinheim, Germany.

In the 3D-printable compositions, the fluoropolymers typically are present as particles. Favourably, the fluorinated polymers are dispersed in the 3D-pintable compositions. Preferably, the fluorinated polymers have a small particle size to allow for a homogenous dispersion. Typically, the particle size corresponds to particle sizes obtained by preparing fluoropolymers in an aqueous emulsion polymerization as known in the art. The fluoropolymers typically have a particle sizes of less than 2,000 nm. Preferably, the fluoropolymer particles have an average particle size of from 50 to 500 nm, or from 70 to 350 nm. Using fluoropolymers of small particle sizes, for example particle sizes typically obtained by emulsion polymerisation of fluoropolymers, where the resulting fluoropolymers have an average particle size of from 50 to 500 nm, or from 70 to 350 nm, may favour the creation of dense fluoropolymer articles, for example shaped fluoropolymers with a high density and/or low void content. However, in application where no dense articles but rather porous articles are desired, larger particle size or different heat treatment or sintering schemes can be applied. The porosity of the resulting shaped article may be controlled this way.

As an alternative to using aqueous fluoropolymer dispersions, fluoropolymer coagulated from such dispersions may be used. The coagulated polymer particles may be dispersed in a solvent, typically an organic solvent. Alternatively, fluoropolymers obtained by suspension polymerization may be used. Typically, particles resulting from suspension polymerizations have a greater particle size than the particle sizes obtained by aqueous emulsion polymerization. The particle sizes of polymers obtained by coagulation and/or suspension polymerization may be greater than 500 nm and may be even greater than 500 μm. Such particles may be milled to smaller particle sizes if desired.

The preferred particle size of the fluoropolymer particles in the 3D-printable composition is less than 500 μm, preferably 50 μm and less, more preferably 5 μm and less. Practical manufacturing limits may dictate that such particles have a size of 0.01 μm or larger, 0.05 μm or larger, or even 1 μm or larger. In other words, the present description includes the ranges beginning at 0.01, 0.05, 0.1, 0.5 or 1 μm and up to 5, 50, or 500 μm.

Fluoropolymer particles of greater particle size may be milled to smaller particles.

In the 3D-printable compositions the fluoropolymers may be dispersed in the binder material or in a dispersing medium or dissolved in a solvent. The dispersing medium includes, for example water or an organic solvent or a combination thereof. Organic solvents generally are liquid at room temperature, i.e. they have a melting point below 20° C. and a boiling point above 25° C., preferably above 50° or even above 70° C. Organic solvents include liquids having at least one carbon atom. Preferably, the 3D-printable compositions are aqueous compositions, i.e. compositions comprising water, for example comprising at least 5% by weight, preferably at least 10% by weight based on the weight of the composition of water. In a convenient way to prepare homogeneous 3D-printable compositions, an aqueous dispersion of the fluoropolymers is provided to which the other ingredients are added. Extrudable compositions may be created from dispersions that may then be upconcentrated, for example by removing water content through evaporation or thermal treatment. Another way of making extrudable pastes includes suspending or dispersing coagulated fluoropolymers in suitable solvents and combining them with the binders or other optional ingredients.

The fluoropolymers described herein and the aqueous fluoropolymer dispersions can be conveniently prepared by aqueous emulsion polymerization as described, for example, in U.S. Pat. No. 2,965,595, EP 1,533,325 and EP 0,969,027.

Various grades of fluoropolymers and fluoropolymer dispersions as described herein are commercially available, for example from Dyneon GmbH, Burgkirchen Germany and from other fluoropolymer producers including but not limited to Chemours, Daikin and Solvay.

Generally, the amounts of fluoropolymers, in particularly not melt-processable fluoropolymers, in the 3D-printable compositions may include but are not limited to from about 25-70%, 30-60%, 25 to 60%, 40-55% or from about 30 to 50% or from about 31 to 45% (percent by weight, based on the total weight of the composition). The optimum concentration may depend on the type and amounts of the other ingredients, for example the binder material and the type of 3D printer used. Too high concentrations of fluoropolymer may lead to the formation of viscous compositions that may be difficult to process in some types of 3D printers, for example VAT polymerization or stereolithography. In that case, the fluoropolymer concentration could be lowered or the composition can be diluted, for example by adding water, solvent or another dispersing medium. Other 3D-printing methods require more viscous compositions such as pastes, for example printers operating with paste extrusions.

The fluoropolymers used in the 3D-printable compositions are preferably prepared by aqueous emulsion polymerization. Preferably, they are provided as aqueous dispersions. The polymerization is typically carried out with fluorinated emulsifiers. The fluorinated emulsifiers stabilise the fluoropolymer dispersion. Typical emulsifiers include those that correspond to the formula

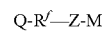

Q-R$^f$—Z-M wherein Q represents hydrogen, Cl or F, whereby Q may be present in a terminal position or not, R$^f$ represents a linear or cyclic or branched perfluorinated or partially fluorinated alkylene having 4 to 15 carbon atoms, Z presents an acid anion, such as COO$^-$ or SO$_3^-$ and M represents a cation including an alkali metal anion or an ammonium ion. Examples fluorinated emulsifiers include those described in EP 1 059 342, EP 712 882, EP 752 432, EP 86 397, U.S. Pat. Nos. 6,025,307, 6,103,843, 6,126,849, 5,229,480, 5,763, 552; 5,688,884, 5,700,859, 5,895,799, WO00/22002 and WO00/71590. Typical examples include but are not limited to emulsifiers of the general formula:

[R$^f$—O-L-COO$^-$]$_i$X$_i^+$ wherein L represents a linear or branched or cyclic, partially or fully fluorinated alkylene group or an aliphatic hydrocarbon group, R$^f$ represents a linear or branched, partially or fully fluorinated aliphatic group or a linear or branched partially or fully fluorinated group interrupted once or more than once with an oxygen atom, X$_i^+$ represents a cation having the valence i and i is 1, 2 and 3. In case the emulsifier contains partially fluorinated aliphatic group it is referred to as a partially fluorinated emulsifier. Preferably, the molecular weight of the emulsifier is less than 1,000 g/mole.

Specific examples are described in, for example, US Pat. Publ. 2007/0015937 (Hintzer et al.). Exemplary emulsifiers include: CF$_3$CF$_2$OCF$_2$CF$_2$OCF$_2$COOH, CHF$_2$(CF$_2$)$_5$COOH, CF$_3$(CF$_2$)$_6$COOH, CF$_3$O(CF$_2$)$_3$OCF(CF$_3$)COOH, CF$_3$CF$_2$CH$_2$OCF$_2$CH$_2$OCF$_2$COOH, CF$_3$O(CF$_2$)$_3$OCHFCF$_2$COOH, CF$_3$O(CF$_2$)$_3$OCF$_2$COOH, CF$_3$(CF$_2$)$_3$(CH$_2$CF$_2$)$_2$CF$_2$CF$_2$CF$_2$COOH, CF$_3$(CF$_2$)$_3$CH$_2$(CF$_2$)$_2$COOH, CF$_3$(CF$_2$)$_2$COOH, CF$_3$(CF$_2$)$_2$(OCF(CF$_3$)CF$_2$)OCF(CF$_3$)COOH, CF$_3$(CF$_2$)$_2$(OCF$_2$CF$_2$)$_4$OCF(CF$_3$)COOH, CF$_3$CF$_2$O(CF$_2$CF$_2$O)$_3$CF$_2$COOH, and their salts.

Therefore, in one embodiment, the 3D-printable compositions may contain one or more fluorinated emulsifiers. Typically, their amount is low (100 ppm or less or 50 ppm or less based on the weight of the composition in any event as low as 10 ppm, 5 ppm, or even low enough to be below the detection limits of the available analytical methods (therefore nominally 0 ppm, 0 ppb, or 0 ppt, depending on the limits of the chosen method)) because the fluorinated emulsifiers may be removed in the work up procedure, for example as described in WO03/051988.

The 3D-printable compositions may comprise one or more stabilizing surfactant. The surfactants may be fluorinated or non-fluorinated and preferably are non-fluorinated. Typically they are non-ionic or amphoteric. Preferred are emulsifiers that provide sufficient shear stability to the fluoropolymer dispersion but degrade or evaporate at the heat process in the work up procedure.

In one embodiment the 3D-printable compositions provided herein may contain one or more stabilizing emulsifiers. Optimum amounts may vary and depend on the binder material and ratio of binder material to fluoropolymer, foaming properties of surfactants, compatibility of the surfactants with the other ingredients, surface-activity of the surfactants and foaming properties of the surfactants because too much foaming may not be suitable. Typical amounts of stabilizing emulsifiers are 0.5 to 12% by weight based on the weight of the 3D-printable composition.

Examples of stabilizing emulsifiers include but are not limited to ethoxylated alcohols, amine oxide surfactants and ethxoyated amine surfactants as will be described in greater detail below.

Ethoxylated Alcohol Surfactants

Examples of non-ionic surfactants can be selected from the group of alkylarylpolyethoxy alcohols (although not preferred), polyoxyalkylene alkyl ether surfactants, and alkoxylated acetylenic diols, preferably ethoxylated acetylenic diols, and mixtures of such surfactants.

In particular embodiments, the non-ionic surfactant or mixture of non-ionic surfactants corresponds to the general formula:

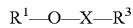

wherein $R^1$ represents a linear or branched aliphatic or aromatic hydrocarbon group that may contain one or more catenary oxygen atoms and having at least 8 carbon atoms, preferably 8 to 18 carbon atoms. In a preferred embodiment, the residue R' corresponds to a residue (R')(R")C— wherein R' and R" are the same or different, linear, branched or cyclic alkyl groups. $R^3$ represents hydrogen or a $C_1$-$C_3$ alkyl group. X represents a plurality of ethoxy units that can also contain one or more propoxy unit. For example, X may represent —[$CH_2CH_2O$]$_n$—[$R^2O$]$_m$—. $R^2$ represents an alkylene having 3 carbon atoms, n has a value of 0 to 40, m has a value of 0 to 40 and the sum of n+m is at least 2 and the units indexed by n and m may be arranged at random. Also mixtures of the above emulsifiers may be used. Commercially available non-ionic surfactants or mixtures of non-ionic surfactants include those available from Clariant GmbH under the trade designation GENAPOL such as GENAPOL X-080 and GENAPOL PF 40. Further suitable non-ionic surfactants that are commercially available include those of the trade designation Tergitol TMN 6, Tergitol TMN 100X and Tergitol TMN 10 from Dow Chemical Company.

Amine Oxide Surfactants

In one embodiment the 3D-printable composition may comprise one or more amine oxide surfactants. Such emulsifiers are described, for example, in U.S. Pat. No. 8,097,673 B2. The amine oxide surfactants may correspond to the formula:

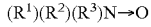

wherein $R^1$ is radical of the formula:

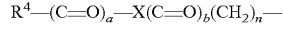

wherein $R^4$ is a saturated or unsaturated, branched or unbranched, cyclic or acyclic, alkyl, hydroxyalkyl, ether or hydroxyether radical having 1 to 20 carbon atoms. X is an O, NH or $NR^5$, a and h are 0 or 1 with the proviso that a+b=1, and n is 2-6;

wherein $R^2$ and $R^3$ are independently selected from saturated or unsaturated, branched or unbranched, cyclic or acyclic, alkyl, hydroxyalkyl, ether or hydroxyether radical having 1 to 10 carbon atoms optionally substituted with halogen;

$R^5$ is selected from saturated or unsaturated, branched or unbranched, cyclic or acyclic, alkyl, hydroxyalkyl, ether or hydroxyether radical having 1 to 10 carbon atoms optionally substituted with halogen or an N-oxylamino group; and wherein that $R^7$ and $R^3$ may be joined by a chemical bond to form a ring.

If $R^2$, $R^3R^4$ and $R^5$ have halogen substitutions, preferably halogen substitutions are limited such that no more than about 70% of the atoms attached to carbon atoms of the radical are halogen atoms, more preferably no more than about 50% are halogen atoms. Most preferably, $R^2$, $R^3R^4$ and $R^5$ are not halogen substituted.

If $R^5$ is substituted with N-oxylamino, groups bonded to the nitrogen atony preferably have 1 to 10 carbon atoms.

In preferred surfactants, R1 is a radical of the formula:

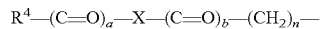

wherein $R^4$ comprises alkyl having 1-20 carbon atoms, X is NH, a and b are 0 or 1 with the proviso that a+b=1, and n is 2-4;

In more preferred surfactants, R1 is a radical of the formula:

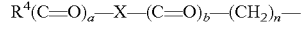

wherein $R^4$ comprises alkyl having 5-20 carbon atoms, X is NH, a and b are 0 or 1 with the proviso that a+b=1, and n is 3.

$R^2$ and $R^3$ in the formula:

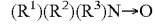

may be independently selected from saturated or unsaturated, branched or unbranched, cyclic or acyclic, alkyl or hydroxyalkyl radical having 1 to 4 carbon atoms.

In one embodiment $R^2$ and $R^3$ in the formula above are each independently selected from alkyl or hydroxyalkyl radicals having 1 to 2 carbon atoms.

Specific examples include cocoamidopropyl dimethyl amine oxide, 2-ethylhexylamidopropyl dimethyl amine oxide, and octylamidopropyl dimethyl amine oxide.

Aminoxide surfactants are commercially available, for example, under the trade designation GENAMINOX from Clariant.

Ethoxylated Amine Surfactants

In another embodiment the 3D-printable compositions may contain one or more ethoxylated amine surfactants. Amine oxide surfactants are described, for example, in U.S. Pat. No. 4,605,773. Ethoxylated amine surfactants may correspond to the formula:

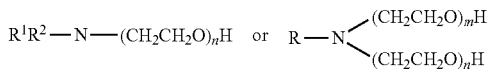

with $R^1$, $R^2$ and R being a non-polar residue, such as being independent from each other a branched, linear or cyclic alkyl, alkyloxy or polyoxy alkyl residue. Each non polar residue may comprise, independent from each other, 4 or more, 6 or more, 8 or more and less than 30, more preferably more than 10 and less than 20, most preferably between 6 and 18 C atoms. In some embodiments one or more of the residues $R_1$, $R_2$ or R may be alkyl-substituted (preferably with a methyl or ethyl group) in the 1-position (that is, the position adjacent to the N-atom) or di-alkyl-substituted in the 1-position.

In both formulae above n and m represent an integer and being independently from each other 1, 2, 3, 4, 5, 6, 7, 8, 9, 10, 11, 12, 13 or 14 or 1 to 10, 1 to 6 or 1 to 4. Preferably, the sum of n and m may be less than 30, more preferably less than 25, most preferably less than 20. The sum of n and m may also be 2, 3, 4, 5, 8, 10, 12, 20 or 25.

The total number of C-atoms in the molecule may be less than 50 or less than 40 or less than 20.

In one embodiment one or more residues of the tertiary amine linked to the N-atom may correspond to the formula:

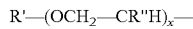

with R' being hydrogen, a branched, linear or cyclic alkyl or aryl residue and R" being hydrogen or an alkyl group including, for example, a methyl, ethyl, propyl, isopropyl, or butyl group. Preferably, R' is a methyl, ethyl, propyl or isopropyl group;

x represents an integer of from 1, 2, 3, or 1 to 10, 1 to 6 or 1 to 4.

In another embodiment, x is an integer from 1 to 10, R" is H or $CH_3$ and R' is selected from the group consisting of H or straight or branched alkyls, such as methyl, ethyl, propyl, isopropyl etc.

Examples of readily available ethoxylated amines include but are not limited to those marketed under the tradename TRITON RW-Series by Dow Chemical Company, Midland, MI, USA, such as for example TRITON RW-20, RW-50, RW-70, RW-100, RW-150, or under the trade designation GENAMIN from Clariant, Basel, Switzerland.

Other emulsifiers contemplated as suitable include sugar-based surfactants, such as glycoside surfactants and polysorbates such as described, for example, in WO2011/014715 A2 (Zipplies et al).

Fluoropolymer Blends

In one embodiment, the 3D-printable compositions comprises mixtures of fluoropolymers. For example in one embodiment the composition comprises mixtures of different non-melt processable fluoropolymers, for example polymers of different molecular weight.

In another embodiment the 3D-printable compositions comprise a blend of one or more non-melt processable fluoropolymer and one or more melt-processable fluoropolymer. The weight ratio of melt processable fluorothermoplasts to non-melt-processable fluoropolymers may be from 1:1 to 1:1000, or from 1:2 to 1:100. The presence of melt processable fluoropolymers in blends with non-melt processable fluoropolymers may lead to a more rapid filling of voids created by the removal of the binder material. This may be advantageous as it may lead to more dense articles after or during a thermal removal of the binder material from the article.

In one embodiment the fluorothermoplasts used in the blends are PFAs. PFAs are copolymers of TFE and at least one perfluoro alkyl vinyl ethers (PAVE's), perfluoro alkyl allyl ethers (PAAE) and combinations thereof. Typical amounts of copolymers range from 1.7% to 10% wt. Preferably, the PFAs have a melting point between 280° C. and 315° C., for example between 280° C. and 300° C.

The fluorothermoplasts may be linear or branched, for example in case they contain HFP, or they may contain longer branches created by using branching modifiers in the polymerization as described, for example in WO2008/140914 A1.

Blends of fluoropolymers may be conveniently prepared by providing the polymers in the form of aqueous dispersions and then blending the dispersions. The resulting dispersion may be upconcentrated to remove water if necessary by thermal evaporation, ultrafiltration or other methods known in the art. The other ingredients of the 3D-printable composition may be added to the dispersion containing the fluoropolymer blends to provide the final 3D-printable composition.

Polymerizable Binder Material

The reactive material of the 3D-printable composition comprises a polymerizable binder material. The polymerizable binder material is matched to the energy source of the 3D printer, or in case a polymerization initiator is used to the polymerization initiator, or both. The polymerization initiator may be activated by the energy source and in turn initiates the polymerization of the polymerizable binder material. The polymerizable binder material is matched to the energy source of the additive processing device (3D printer) or polymerization initiator, such that exposure of the 3D printable composition to the energy emitted from the energy source allows polymerization to proceed at appropriate speed in the part of the composition that has been exposed to the energy emitted from the energy source of the 3D printer. For example, if the energy source is UV light, the polymerizable binder has reactive groups that are activated by irradiation with UV-light to start the polymerization. Alternatively or additionally, the composition may contain a photoinitiator that is reactive to UV irradiation and the activated photoinitiator then activates the reactive groups in the polymerizable binder to set off the polymerization.

The structure and nature of the polymerizable binder material is not particularly limited unless the desired result cannot be achieved. Upon polymerization the polymerizable binder forms a network with the dispersed fluoropolymer particles resulting in a solidified or gelled composition with the fluoropolymer particles contained in the polymerized binder network. This composition already has the three-dimensional shape of the final article but may contain liquid (dispersing medium, for example water), and is referred to as "green body". The optimum amount and type of polymerizable binder material may be determined taking into account the following: the amount of binder material preferably is high enough such that it allows to solidify in the areas where the layers are to be created, i.e. it is preferably present in an effective amount to allow the formation of solidified layers of the desired dimensions. Secondly, the amount of polymerized binder may be minimised with respect to the fluoropolymer content to minimise or avoid shrinking of the article during the working up process. Also the formation of voids in the finished articles created during the removal of the polymerized binder material may be minimised or even avoided. Also the stability of the fluoropolymer dispersion has to be considered and too high amounts of binder material may lead to premature coagulation of the fluoropolymer dispersion or solution. The binder material is capable to polymerize to form a solid or gel of sufficient strength to retain dimensional stability throughout the creation of the created object. However, the polymerized binder material should not be responsible for the dimensional stability of the finished article and can be removed (preferably thermally) during the work up procedure without the article becoming dimensionally unstable. The polymerizable binder material desirably polymerizes fast under the conditions in the additive processing machine.

Further, the polymerized binder thermally degrades at temperatures below the melting temperature of the fluoropolymer, preferably it can be combusted at such conditions.

Preferably, the polymerizable binder material is dissolved or dispersed in the 3D printable composition. In one embodiment, the polymerizable binder material is liquid. To dissolve or disperse the binder material organic solvents or dispersants may be used or an aqueous medium like water may be used. The organic solvents or dispersants are preferably inert and do not polymerize or react with the binder or polymerization initiator.

A suitable polymerizable binder material includes monomers, oligomers or polymers with polymerizable groups, preferably end groups, that preferably are liquid or that can be dispersed or dissolved in a liquid, for example water. The polymerizable end groups include groups reactive to electromagnetic irradiation by polymerization or that polymerize upon activation by polymerization initiators or a combination thereof.

Suitable polymerizable binder materials include compounds with polymerizable groups comprising one or more olefinic unsaturation. Examples include compounds with end or side groups comprising one or more ethylenic unit, ie. a carbon-carbon unsaturation. Examples include end groups comprising one or more of the groups selected from vinyl groups (e.g., $H_2C=CX$— groups), allyl groups (e.g., $H_2C=CX-CX^1X^2$—), vinyl ether groups (e.g., $H_2C=CHX-O$—), allyl ether groups e.g., ($H_2C=CX-CX^1X^2-O$—), and acrylate groups (e.g., $H_2C=CH-CO_2$—) and combinations thereof. In the formula X represents H, methyl, halogen (F, Cl, Br, I) or nitrile and $X^1$ and $X^2$ each independently represents H, methyl, halogen (F, Cl, Br, I) or nitrile. In a preferred embodiment $X^2$ and $X^1$ are all H and X represents H or $CH_3$. Examples include but are not limited to ethylene groups, vinyl groups, allyl groups. Suitable polymerizable groups include but are not limited to end and side groups comprising one or more units corresponding to the general formula (I)-(VI):

  $H_2C=C(X)$— (I)

  $H_2C=C(X)-O$— (II)

  $H_2C=C(X)-CH_2-O$— (III)

  $H_2C=C(X)-C(=O)$— (IV)

  $H_2C=CX-CO_2$— (V)

  $H_2C=C(X)-OC(O)$— (VI)

Examples of polymerizable binder materials include mono acrylates and mono methacrylates, i.e. compounds with one end or side group comprising an acrylate group or methacrylate group (e.g. an $H_2C=CX-CO_2$— group where X is $CH_3$). Another example includes poly acrylates or poly methyl acrylates, i.e. compounds having more than one end and/or side groups comprising an acrylate or methacrylate group. Yet other examples include monomeric, oligomeric and polymeric acrylates. Oligomeric acrylates comprise from 1 up to 25 repeating monomeric units. Polymeric acrylates comprise more than 25 repeating units. Further, these compounds comprise at least one acrylate end or side group to qualify as polymerizsable acrylates. Examples of repeating units of such monomeric, oligomeric or polymeric acrylates include but are not limited to ethoxy ($-CH_2CH_2-O-$) units and propoxy ($-C_3H_6O-$) units as well as acrylate units and combinations thereof. Acrylates comprising an ethoxy unit are referred to also as "ethoxylated acrylates".

Specific examples include ethoxylated or polyethoxylated acrylates, for example polyethylene glycols having one, two or three acrylic end or side groups. Other examples include acrylates having one or more than one acrylate group linked to an alkyl or alkylene chain that may be interrupted once or more than once by oxygen atoms. Acrylates include but are not limited to monoacrylates, diacrylates and triacrylates and combinations thereof including their methacrylic equivalents. Specific examples include but are not limited to exthoxylated triacrylates and diacrylates and the corresponding methacrylates. Specific examples include ethoxylated trimethylol propane triacrylates (SR415); polyethylene glycol dimethacrylate (SR252), polyethylene glycol diacrylate (SR344), ethoxylated bisphenyl A dimethacrylate (SR9036A), ethoxylated bisphenyl A dimethacrylate (SR9038) all commercially available from Sartomer Americas, Exton, PA, USA.

In one embodiment of the present disclosure the binder material comprises a polyethylene glycol di- or tnacrlyate or a combination of polylethlyene glycol di- and triacrylates.

The overall composition of the polymerizable material may be selected so that the polymerized material is liquid, or is soluble in a solvent or dispersing medium used in the 3D-printable composition, e.g. water. Further, the overall composition of the polymerizable material can be selected to adjust compatibility with the other ingredients of the 3D-printable composition or to adjust the strength, flexibility, and uniformity of the polymerized material. Still further, the overall composition of the polymerizable material can be selected to adjust the burnout characteristics of the polymerized material prior to sintering. Various combinations of binder materials may be possible and are available to the person skilled in the art. Mixtures of different polymerizable binder materials may be used. For example bi- or polyfunctional polymerizable binder materials may be included that generate a cross-linked network. A successful build typically requires a certain level of green body gel strength as well as shape resolution. A crosslinked approach often times allows for greater green body gel strength to be realized at a lower energy dose since the polymerization creates a stronger network. The presence of monomers having a plurality of polymerizable groups tends to enhance the strength of the gel composition formed when the printing sol is polymerized. The amount of the monomer with a plurality of the polymerizable groups can be used to adjust the flexibility and the strength of the green body, and indirectly optimize the green body resolution and final article resolution.

In the following, exemplary binder materials are contemplated as being useful as an alternative to the materials described above or in combination with them.

Examples include but are not limited to acrylic acid, methacrylic acid, beta-carboxyethyl acrylate, and mono-2-(methacryloxyethyl)succinate. Exemplary polymerization hydroxyl-containing monomers for use as binder or for preparing binder compositions include hydroxyethyl acrylate, hydroxyethyl methacrylate, hydroxypropyl acrylate, hydroxypropyl methacrylate, hydroxyl butyl acrylate, and hydroxybutyl methacrylate. Acryloxy and methacryloxy functional polyethylene oxide, and polypropylene oxide may also be used as the polymerizable hydroxyl-containing monomers.

An exemplary radically polymerizable binder material comprises mono-(methacryloxypolyethyleneglycol) succinate.

Another example of a radically polymerizable binder material (activitatted by a photoinitiator) is a polymerizable silane. Exemplary polymerizable silanes include methacryloxyalkyltrialkoxysilanes, or acryloxyalkyltrialkoxysilanes (e.g., 3-methacryloxypropyltrimethoxysilane, 3-acryloxypropyltrimethoxy-silane, and 3-(methacryloxy)propyltriethoxysilane; as 3-(methacryloxy)propylmethyldimethoxysilane, and 3-(acryloxypropyl)methyldimethoxysilane); methacryloxyalkyldialkylalkoxysilanes or acyrloxyalkyldialkylalkoxysilanes (e.g., 3-(methacryloxy)propyldimethylethoxysilane); mercaptoalkyltrialkoxylsilanes (e.g., 3-mercaptopropyltrimethoxysilane); aryltrialkoxysilanes (e.g., styrylethyltrimethoxysilane); vinylsilanes (e.g., vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, and vinyltris(2-methoxyethoxy)silane).

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth) acrylate, and neopentylglycol hydroxypivalate diacrylate modified caprolactone.

Exemplary monomers with three or four (meth)acryloyl groups include, but are not limited to, trimethylolpropane triacrylate (e.g., commercially available under the trade designation TMPTA-N from Cytec Industries, Inc. (Smyrna, GA, USA) and under the trade designation SR-351 from Sartomer (Exton, PA, USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaerythritol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer).

Exemplary monomers for use as polymerizable binders include alkyl (meth)acrylates that have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, 3,3,5-trimethylcyclohexyl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth) acrylate, and heptadecanyl (meth)acrylate.

Optimum amounts of binder material may be adapted to the specific system used. Generally, suitable amounts of polymerizable binder are from 1 to 50%, or from 2 to 25%, or from 10 to 20% (weight per cents based on the total weight of the compositions) The polymerized binder may have to be removed during the work-up procedure so the binder material should not be used in a great excess over the fluoropolymer particles as this may cause a structural failure of the article. Optimum ratios of fluoropolymer to polymerizable binder material depend on the type and nature of the binder material but may typically include, but are not limited to, weight ratios of fluoropolymer to polymerizable binder material of from 5:1 to 1:2, preferably from 4:1 to 1:1.

In some applications, it can be advantageous to minimize the weight ratio of polymerizable binder material to fluoropolymer particles in the reaction mixture. This tends to reduce the amount of decomposition products of organic material that needs to be burned out prior to formation of the sintered article. The amount of binder may also depend on the speed at which the fluoropolymer particles sinter. If the sintering proceeds fast the combustion gases from the binder material get trapped inside the article, which can lead to a reduced density or to surface defects. In this case oxidation catalysts may be used or the amount binder may be reduced.

Preferably, the polymerizable binder material has a weight of from 100 to 5,000 g/mole or comprises polymerizable monomers or oligomers having a molecular weight from 100 to 5,000 g/mole. This facilitates the formation of a 3D-printable composition of a favourably low viscosity. Also lower molecular weight polymerizable binder material may be better soluble in an aqueous dispersion than high molecular weight material.

Other exemplary polymerizable binder materials contemplated herein include materials with polymerizable groups including but not limited to epoxides, silanes and reactive components that can polymerize to form polyurethanes (e.g hydroxyl groups, ester groups, isocyanate groups).

Other Additives
Polymerization Initiators

One or more polymerization initiators that initiate polymerization of the polymerizable binder material may be present in the 3D-printable composition. The polymerization initiator gets activated upon exposure to the energy source, for example, upon exposure to UV irradiation or e-beam irradiation, or heat. Initiators that are activated by irradiation with visible or invisible light are referred to as photoinitiators. Polymerization initiators may be organic or inorganic. Polymerization Initiators are known in the art and are commercially available. Preferably, the following classes of photoinitiator(s) can be used: a) two-component system where a radical is generated through abstraction of a hydrogen atom form a donor compound; b) one component system where two radicals are generated by cleavage.

Examples of photoinitiators according to type (a) typically contain a moiety selected from benzophenone, xanthone or quinone in combination with an aliphatic amine.

Examples of photoinitiators according to type (b) typically contain a moiety selected form benzoin ether, acetophenon, benzoyl oxime or acyl phosphine.

Exemplary UV initiators include 1-hydroxycyclohexyl benzophenone (available, for example, under the trade designation "IRGACURE 184" from Ciba Specialty Chemicals Corp., Tarrytown, NY), 4-(2-hydroxyethoxy)phenyl-(2-hydroxy-2-propyl) ketone (available, for example, under the trade designation "IRGACURE 2529" from Ciba Specialty Chemicals Corp.), 2-hydroxy-2-methylpropiophenone (available, for example, under the trade designation "DAROCURE D111" from Ciba Specialty Chemicals Corp. and bis(2,4,6-trimethylbenzoyl)-phenylposphineoxide (available, for example, under the trade designation "IRGACURE 819" from Ciba Specialty Chemicals Corp.).

In one embodiment of the present disclosure a polymerization initiator is used with a polymerizable binder material selected from acrylates. Typically the polymerization initiator is a photoinitiator, which is activated by irradiation with visible or invisible light, preferably by UV irradiation. The optimum amounts of initiator depend on the system used. Typical amounts include but are not limited to amounts of 1 to 0.005 times the weight of the polymerizable binder used.

The photoinitiator should be able to start or initiate the polymerization of the polymerizable binder material. Typical amounts of photoinitiator(s) include but are not limited to the following amounts: Lower amount: at least 0.01 or at least 0.1 or at least 0.5 wt.-%; Upper amount: at most 0.5 or at most 1.5 or at most 3 wt.-%; Range: from 0.01 to 3 or from 0.5 to 1.5 wt.-%; wt.-% with respect to the weight of the 3D-printable composition.

Instead of polymerization initiators that are activated by visible or invisible light, like UV irradiation, it is also possible to use initiators that are activated thermally or by actinic irradiation. In such case, the energy source is appropriately selected to allow activation of the initiators.

Polymerization Inhibitors

The 3D-printable compositions may also contain one or more polymerization inhibitors, to help keeping the polymerization reaction localized to the areas that have been exposed to the energy source of the additive processing machine. Such polymerization inhibitors slow down the polymerization reaction or terminate it, for example by acting as radical scavangers. Inhibitors for polymerization with irradiation through light, including UV light are known in the art as "photoinhibitors" and include commercially available materials such as 2,6-di-tert-butyl-4-methylphenol, available from Sigma-Aldrich, St Louis, MO, USA. Optimum amounts of inhibitors depend on the system of polymerizable binder material, initiators and energy source used. Typical amounts of inhibitors include but are not limited to amounts of from 0.9 to 0.001 times the amount of polymerization initiator (by weight).

Fillers, Pigments, UV Enhancers and Oxidation Catalysts

The 3D-printable compositions may further comprise fillers, pigments or dyes if compatible with the 3D printer used and the thermal work up treatment. Fillers may include but are not limited to silicon carbide, boron nitride, molybdenum sulfide, aluminum oxides, carbon particles, such as graphite or carbon black, carbon fibers, carbon nanotubes.

The filler content can be optimized to the system used and may typically be between 0.01 to 10% or up to 30% or even up to 50% by weight based on the total weight of the composition depending on the fluoropolymer and binder materials used. The fillers should be in particulate form and have sufficiently small particle size to allow for a homogeneous dispersion in the 3D-printable composition. To be compatible with the 3D-printable composition the filler particles advantageously have a particle size of less than 500 µm, preferably less than 50 µm or even less than 5 µm.

Pigments have to be heat-stable at the temperatures applied in the thermal work up procedures, i.e. at least the melting temperature of the non-melt processable fluoropolymer.

Ingredients that increase the irradiation energy from the energy may also be included in the 3D printable composition. For example, by activation through UV irradiation UV enhancers ("optical brighteners") may be included in the composition. These are chemical compounds that absorb light in the ultraviolet and violet region (usually 340-370 nm) of the, and re-emit light in the blue region (typically 420-470 nm) by fluorescence. A useful optical brightener is Benetex OB-M1. Lakefield ct. Suwanee, GA 30024. This UV brighteners may also help to limit the penetration of the irradiation from the energy source through the 3D-printable composition and to control the polymerization to localized areas.

Oxidation catalysts may also be included in the 3D-printable composition to accelerate the combustion of binder during the thermal work up procedure. This may help to create a smoother surface and to avoid the formation of surface defects. It is believed that when the combustion of the binder material is not completed when the surface particles fuse during a sintering step trapped combustion gases may lead to formation of microbubbles or micro cracks on the surface of the sintered article. The oxidation catalyst may accelerate the combustion such that the combustion gases have evaporated before the fluoropolymer particles on the surface fuse. Oxidation catalysts are described for example in U.S. Pat. No. 4,120,608 and include cerium oxides or other metal oxides. Cerium oxide is commercially available from Nyacol Nano Technologies Inc. This might reduce scattering effects from the US source.

Additive Processing of the 3D-Printable Composition

The 3D-printable composition is entered into the additive processing machine (3D printer) and is subjected to additive processing to create a three-dimensional object containing fluoropolymer, polymerized binder and dispersing medium (for example water) or solvent. This article already has the overall shape of the final article and is referred to as "first green body". The first green body may be removed from the 3D printer and may be separated from the unreacted composition. The unreacted composition may be discarded or reused. In one embodiment of the present disclosure there is provided a fluoropolymer article containing a shaped fluoropolymer and is obtainable by additive processing as described herein. The article is the "first green body". This article may comprise from 10 to 50% by weight of the polymerizable or polymerized binder material. The article may further contain from 5 to 50% of dispersing medium including water and from 10 to 90% of the fluoropolymer as described herein, or from 20 to 70% of the fluoropolymer as described herein. The weight percentages are based on the weight of the article (100%) and total amount of the ingredients of the article does not exceed 100%. The article is made up of a composition having a density of 2.00 g/cm$^3$ or less, for example less than 1.99 g/cm$^3$. The first green body can also be referred to as an "aquagel". The aquagel has the same general shape as the final article (article after removal of the binder) but is typically less dense and also less rigid and more porous.

The solvent or dispersing medium and other residues may have to be removed from the first green body. This may be done by evaporating the solvent or dispersing medium, for example by heat treatment. For example, drying can be carried out at room temperature at elevated temperatures, or under vacuum and combinations thereof. Drying may be carried out with heated air or heated gases (for example propane). Drying may also be carried out under controlled humidity for example under constant 50 to 90% humidity or under controlled decrease of humidity, for example from 90% to 50% over 24 hours. Freeze drying may also be used. Dielectric drying and drying by radiation (for instance microwaves being absorbed inside the material or drying by IR) may also be used. Dielectric drying and drying by radiation may be assisted by air drying or vacuum drying.

However, according to the present disclosure removal of solvent or dispersing agent preferably involves treatment (for example extraction) with a super critical fluid, preferably supercritical carbon dioxide ($CO_2$). Other supercritical fluids that may be used include but are not limited to methane, ethane, propane, ethene, propene, methanol, ethanol or acetone. Typically, the solvent or dispersing medium is removed by extraction with the supercritical fluid.

If the dispersing medium or solvent is not miscible with the supercritical fluid, the solvent or dispersing medium is exchanged with a solvent or solvent mixture that is miscible with the super critical fluid, typically prior to extraction with the supercritical fluid. The solvent exchange can be carried out by submerging the first green body into the exchange solvent for an extended period of time and then discarding the solvents. These steps may be repeated once or several times. Ex-change solvents include but are not limited to methanol, ethanol, isopropanol, methoxyethanol, β-ethoxyethanol, methoxypropanol, i-butyl alcohol, sec-butyl alcohol, amyl alcohol, hexanol, cyclohexanol, cyclohexane, heptane, dodecane, formic acid, acetic acid, hexanoic acid, isohexanoic acid, octanoic acid, acetaldehyde, acetic anhydride, acetone, acetonitrile, acetophenone, acetyl chloride, acrolein, acetonitrile, benzene, benzaldehyde, benzonitrile, benzoyl chloride, 2-butanone, n-butyl ether, camphor, carbon disulfide, carbon tetrachloride, chloroacetone, chlorobenzene, chloroform, cyclohexanone, 1-decene, p-dichlorobenzene, diethylene glycol monoethyl ether, N,N-diethylacetamide, N,N-dimethylacetamide, N,N-dimethylformamide, N,N-diethylformamide, 2,2-dimethylpentane, p-dioxane, ethyl acetate, ethyl acetoacetate, ethyl benzoate, ethyl carbonate, ethyl chloroacetate, ethyl chloroformate, ethylene bromide, ethylene diformate, ethylene glycol monobutyl ether, ethyl ether, ethyl formate, ethyl lactate, ethyl maleate, ethyl oxalate, ethyl phenylacetate, ethyl salicylate, ethyl succinate, ethyl sulfate, furfural, 1-heptaldehyde, 2,5-hexanedione, indene, isopropyl ether, limonene, methyl acetate, methyl benzoate, methylcyclohexane, methyl formate, methyl salicylate, methyl sulfate, nitrobenzene, nitroethane, nitromethane, o-nitrophenol, nitrotoluene, 1-nitropropane, 2-octanone, thioxane, paraldehyde, pentanaldehyde, 2-picoline, pinene, propionaldehyde, pyridine, salicylaldehyde, thiophene, toluene, triacetin, tri-sec-butylbenzene, and 2,2,3-trimethylbutane.

Preferably, the exchange solvent is an alcohol (preferably an alkanoic alcohol), an ether alcohol or polyether alcohol, a polyol, polyether polyol or combinations thereof. The exchange solvent preferably is aliphatic, more preferably aliphatic and non-halogenic.

For the treatment with a super critical fluid the article is typically placed in an autoclave. The fluid is pumped into the autoclave at a temperature above the critical temperature of the fluid and at pressure greater than the critical pressure of the fluid. Temperature and pressures required to keep the fluid in the super critical state are maintained in the autoclave for a time sufficient to complete the solvent exchange by pumping an additional quantity of the fluid into the autoclave and venting the mixture of supercritical fluid and solvent/dispersion medium to a separator vessel and releasing the pressure. When the extraction is completed or terminated the pressure is released and the supercritical fluid can be removed or released.

A supercritical fluid is a substance at a temperature and pressure above its critical point, where distinct liquid and gas phases do not exist. The critical point (or critical state) is the end point of a phase (liquid-vapor) equilibrium curve that designates conditions under which a liquid and its vapor can coexist. At the critical point, defined by a critical temperature $T_c$ nd a critical pressure $p_c$ phase boundaries vanish. Extraction conditions for $CO_2$ are above the critical temperature of 31° C. and critical pressure of 74 bar. Further information on the principles and practice of super critical extraction can be found, for example, in van Bommel, M. J., and de Haan, A. B. J. Materials Sci. 29 (1994) 943-948, Francis, A. W. J. Phys. Chem. 58 (1954) 1099-1114 and cHugh, M. A., and rukonis, V. J. Supercritical Fluid Extraction: Principles and Practice. Stoneham, MA, Butterworth-Heinemann, 1986, incorporated herein by reference.

After subjecting the article to the treatment with a supercritical fluid the article (also referred to herein as "second green body") contains less or no dispersing medium or solvent but may still contain binder material. Therefore, in another embodiment of the present disclosure a fluoropolymer article is provided containing a shaped fluoropolymer that may comprise from 0.1 to 50% by weight based on the weight of the article of the polymerizable and/or polymerized binder material described herein. The article may further contain from 15-95% by weight or from 45 to 90% by weight based on the weight of the article of fluoropolymers as described herein. The article preferably contains less than 10% by weight, preferably less than 1%, more preferably less than 0.1% by weight of solvent and/or water or no water or solvent. The article is made up of a composition having a density of 2.00 g/cm³ or less, for example less than 1.99 g/cm³. Such an article can also be referred to as an aerogel. The aerogel has the same general shape as the final article but is typically less dense and also less rigid and more porous.

It has been found that by treatment with a supercritical fluid, including but not limited to supercritical $CO_2$, to remove solvents or dispersing media from the green body, thermal drying to evaporate solvent or dispersing media can be avoided or the length of such drying steps can be reduced. This can be advantageous, in particular for articles containing one or more internal or external walls having a thickness of at least 1 mm, or even at least 5 mm (for example but not limited to from 1 mm to 50 mm) and in particular for articles having walls of different thicknesses. In such cases drying by heat-treatment may lead to less uniform drying creating stress within the structure during the thermal drying process. In particular during sintering this may result in cracks in the surface and other surface deformations. Also, the time period for completely burning out binder materials may be shortened when the green body has been subjected to extraction with supercritical fluids.

Extraction with supercritical fluids, for example $CO_2$, can be used in addition to thermal drying but thermal drying to remove solvent or dispersing media may not be needed.

In a preferred embodiment, the dispersing medium is or comprises water. Prior to treatment with supercritical fluid, preferably $CO_2$, water is exchanged with a solvent, preferably an alcohol, an ether alcohol or polyether alcohol, a polyol, polyether polyol or combinations thereof. The solvent preferably is aliphatic, more preferably aliphatic and non-halogenic.

The binder material may be removed from the second green body in a separate or parallel heating regime. Conveniently this is carried out by a heat treatment to degrade (for example by oxidization or combustion) and/or evaporate the polymerized or unpolymerized binder material. The temperatures are typically chosen such that the fluoropolymer article does not melt or gets destroyed, although in particular for fluoropolymers with low MFI, and in particular for "non-melt processable" fluoroplymers sintering may be used where heating above the melting point of the fluoropolymer may be carried out. Preferably, sintering is carried out in a subsequent heat treatment step. Typically, the article turns black during the combustion/oxidation step of the heat treatment. In an additional heating step the temperature may be raised to the melting temperature of the non-melt-processable fluoropolymer or above ("sintering"). At such temperatures the fluoropolymer particles will fuse but because of the extremely high melt-viscosity of these polymers, they will retain their shape. Through this sintering step the density of the article can be further increased. In the sintering step the article is subjected to temperatures at or above the melting temperature of the fluoropolymer, in particular the non melt-processable fluoropolymer, but below its degradation temperature. The heat treatment may depend on the melt flow index of the fluoropolymer used. Heat treatment of up to 20° C., up to 40° or even up to 60° C. or even higher than 60° C. above the melting point of the fluoropolymer, in particular for non-melt processable fluoropolymers may be carried out in the sintering step. The remaining binder material burns off at the sintering step and the article turns white. However, burn-out and sintering can be controlled such that the binder material does not completely burn off and residual amounts remain in the article, which may be desired for some applications. The presence of residual degraded binder material may add some properties to the article that may be desirable for particular applications. Heating (burn out) and sintering conditions may vary depending on the structure and composition of the articles. The number of discrete heating steps, temperatures, duration of heating periods and number of heating intervals can be optimized by routine experimentation.

The final article typically has the same shape as the first or second green bodies, although some shrinking compared to the green body may be observed. By doing controls and test runs the amount of shrinking can be taken into account when programming the additive processing machine. Shrinking may be minimised by maximizing the fluoropolymer content of the 3D printable composition.

The fluoropolymer articles obtained after sintering may have few voids. Without being bound by theory, it is believed that during the sintering step the fluoropolymer particles have fused together thus eliminating voids created by removing the binder. Shaped fluoropolymers can be obtained that have a void content of less than 20% (200‰), preferably less than 10% (100‰), or less than 2% (20‰).

For example, shaped fluoropolymers can be provided having a void content between 0.1 and 1.5% (1 and 15% ‰), between 2.2 to 5.5% (22 and 55‰), between 6.0 to 12.0% (60 to 120‰) or between 12.5 to 18.5% (125 to 185‰). In one embodiment the fluoropolymer has a void content (Voi) of from 1‰ to 55‰). It is also believed that the small particle size of the fluoropolymers in the 3D-printable compositions is benefitial for creating such dense shaped fluoropolymers as characterized by a low void content.

It is contemplated that shaped fluoropolymers may be obtained that have stretch void index (SVI) at an elongation of 200% or 100% of less than 200, or less than 100 or even less than 9.

Fluoropolymer articles where the fluoropolymer has a density of more than 2.00, for example between 2.05 and 2.11 $g/cm^3$ may be obtained by the processes disclosed herein. In one embodiment the fluoropolymer article has a density of from 2.13 to 2.17 $g/cm^3$. Such densities and void contents may be reached with sintering at ambient pressure (1 bar).

Articles

The fluoropolymers described above can be shaped into articles by the methods provided in the present disclosure. The shaped fluoropolymers themselves may be articles and are also referred to herein as "fluoropolymer articles". The fluoropolymer articles may or may not be components of other articles.

The shaped fluoropolymers may contain one or more fillers or one or more other ingredients. In one embodiment the shaped fluoropolymers comprise from 50 to 100% by weight of the fluoropolymers, or from 55 to 95% by weight of fluoropolymers. In one embodiment the shaped fluoropolymer comprises one or more filler and the amount of fillers may be up to 1%, or up to 10% or even up to 50% by weight based on the weight of the fluoropolymer article.

It is an advantage of the methods and compositions of the present disclosure that fluoropolymers and in particular not melt-processable fluoropolymers can be shaped into articles having geometries and designs that could not be produced by machining with shaping tools. This includes integral articles comprising an essentially hollow structure. Hollow structures can be prepared by machining but only to some extent. Usually hollow structures are prepared in several steps and separate parts are joined, for example by welding. This leaves a seam (for example a weld seam) or a bond line visible to the naked eye. "Integral articles" as used herein do not have joint parts or an interface where two or more parts have been joint together. They do not have a seam or a bond line. With the 3D-printable compositions provided herein integral fluoropolymer articles with complex geometries can be prepared. Examples include but are not limited to integral and essentially hollow fluoropolymer articles. "Essentially hollow articles" as used herein are articles that comprise a hollow structure or a hollow component, for example, but not limited to, a hollow sphere, a cylinder, a cube, or a pyramid that has a continuous or an essentially continuous surface. An "essentially continuous surface" as used herein contains one or more apertures penetrating the surface. Preferably, less than 40% or less than 30%, more preferably less than 10% or less than 1% of the surface area of the continuous surface is interrupted by one or more apertures penetrating through the surface into the hollow part. Other structures that are difficult or even impossible to produce by conventional machining include honeycomb structures without weld seams. Further examples include integral articles with one or more undercuts, for example integral articles having one or more opening or aperture but further contain one or more undercuts at the inner side of the opening or aperture or behind the opening or aperture.

Fluoropolymer articles of big and small dimensions can be produced. The size of the additive processing device may set a limitation to the size of the articles that can be produced.

Articles of small dimensions may be conveniently produced by the methods described herein. An article comprising a shaped fluoropolymer can be prepared having a longest axis (as the case may be this may also be a diameter) that is smaller than 1.0 cm or even smaller than 0.7 mm. In one embodiment small fluoropolymer articles may be produced having a longest axis or diameter of from about 0.01 to about 1.0 mm, or from 0.7 to 1.5 cm.

Larger articles may also be produced with the methods provided herein, for example, but not limited to articles having a smallest axis or diameter of at least 1.1 mm. The present methods are particularly useful for larger articles for example articles having a longest axis (as the case may be this may also be a diameter) that is greater than 1.0 cm or even greater than 10 cm or greater than 20 cm (for example, but not limited to, articles having a longest axis or diameter of from 1.0 to 50 cm).

In particular, the methods provided herein are also useful for making articles having one or more than one internal or external walls with a thickness of at least 1 mm, preferably at least 2 mm, for example but not limited to wall thicknesses between 1.1 mm and 20 cm. The articles preferably have one or more internal or external walls having different thicknesses, preferably the walls differ in their thickness by at least 1 mm, for example but not limited to differences in wall thickness between 1.1 mm and 10 cm. The maximum length/diameter of the articles that can be produced is believed to be limited by the dimensions of the additive processing device. A maximum length may include, for example, but not limited to, a maximum length or diameter of 30 cm or 50 cm. An internal wall is a structure in the article that divides the space in the article. The wall typically has a length and a height and a width. The width is the dimension that is smaller than the length and the height of the wall. The thickness of the wall corresponds to the width of the wall. An external wall may be a circumferential wall of the article.

Fluoropolymer articles can be produced by the additive processing as described herein having mechanical properties comparable to fluoropolymer articles prepared by conventional machining. For example shaped fluoropolymers, in particular non melt-processable fluoropolymers, can be produced by the method of the present disclosure having a tensile strength of from at least 5 MPa, for at least 12 or at least 24 MPa. The shaped, fluoropolymers, in particular shaped non melt-processable fluoropolymers may have an elongation at break of at least 100% for example, but not limited to, an elongation at break of 150 to 400%.

Shaped fluoropolymers and articles can be produced with the methods and compositions of the present disclosure that have a specific density of more than 2.05 g/cm$^3$ without applying any pressure, i.e. at ambient pressure (1 bar) or even at reduced pressure. (The specific density refers to the density of the composition making up the article). As a result the shaped, fluoropolymers are not oriented and are essentially isotropic, at least in two of the three spatial directions). This presents another advantage of the methods and compositions provided herein. Fluoropolymers with a low MFI, for example below 50 g/10 min (MFI 372/5) and in particularly the so-called non melt-processable fluoropolymers have been conveniently shaped so far by subjecting the fluoropolymer to forces under high pressure (and temperatures). As a result the shaped fluoropolymer is oriented (anisotropic) and the shaped fluoropolymer may have different mechanical properties at different spatial coordinates (e.g. different properties in the longitudinal and transverse direction).

With the compositions and methods of the present disclosure shaped fluoropolymers can be prepared that are essentially isotropic. For example, shaped fluoropolymers can be prepared by the 3D-printing methods provided herein, that have a degree of orientation of less than 20%, or even less than 10% or even less than 5% (as determined by polarized light microscopy).

In one embodiment a shaped fluoropolymer may be provided that is essentially isotropic regarding its tensile strength and/or elongation at break, which means the fluoropolymer has essentially the same properties in at least two of all three spatial orientations (x-, y-, and z-direction, x being the longitudinal direction, y being the transversal direction and z being perpendicular to the x and y direction), or the properties deviate by less than 50% or less than 20%, preferably less than 10%, more preferably less than 5% and most preferably less than 1%.

The fluoropolymers, in particular non melt-processable fluoropolymers, can be shaped into articles that have at least one element or part of a defined geometrical shape. Defined geometrical shapes include but are not limited to circles, semicircles, ellipses, half-spheres, squares, rectangles, cubes, polygons (including but not limited to triangles, hexagons, pentagons, and octagons) and polyhedrons. The shapes include pyramids, cuboids, cubes, cylinders, half-cylinders, spheres, half-spheres. The shapes also include shapes composed of different shapes like diamonds (combination of two triangles). For example, a honeycomb structure contains several hexagons as geometrical elements. In one embodiment the geometrical shape has an axis or diameter of at least 0.5 millimetres, or at least one millimetre or at least 2 millimetres or at least one centimeter.

The shaped fluoropolymers obtained by the 3D printing methods provided herein also differ from those shaped by conventional methods in that their surface does not show any marks from shaping tools. This can be determined, for example, by optical microscopy or raster electron microscopy.

As another advantage of the methods and compositions provided herein is that shaped fluoropolymers may be prepared that contain fillers and that are essentially isotropic with respect to the distribution of the fillers. Filler of not spherical shape may get oriented when shaping not melt-processable fluoropolymers with conventional shaping methods. With the method provided herein such fillers may not get oriented but may be distributed randomly in the fluoropolymer composition. Examples of such fillers include but are not limited to carbon fibers, glass fibers, ceramic fibers, polyaramide fibers, boron nitride, aluminum oxides and aluminum oxide containing fillers, graphite, carbon and carbon nanotubes. The distribution of fillers can be determined by optical or electronic microscopy of samples.

As another advantage of the methods and compositions provided herein is that shaped fluoropolymers may be prepared that are essentially isotropic with regard to their electronically conductive properties. Such fluoropolymer articles contain one or more electronically conductive filler, including, for example, graphite and carbon nanotubes. Electrical Conductivity and electrical volume resistivity can be measured, for example, in accordance with ASTM F84-98 as published in November 1998.

As another advantage of the methods and compositions provided herein is that shaped fluoropolymers may be prepared that are isotropic with respect to thermal conductivity. Such fluoropolymer articles contain filler that are thermally conductive and include, for example, graphite and boron nitride. Thermal conductivity and thermal resistivity can be determined, for example, according to ASTM E1461-13 (published in October 2013).

It has also been found that articles can be produced by additive processing that have a smooth surface, i.e. a low surface roughness. Without wishing to be bound by theory it is believed that although the articles are created layer-on-layer the boundaries between the individual layers may blend during the heat-treatment, in particular sintering. Therefore, the articles created by the methods described herein may have a low surface roughness, in particular for curved surfaces or structures, for surfaces in the shape of cylinders, half-cylinders, spheres, half-spheres, cones, pyramids and combinations thereof. Preferably the curved surface is part of an internal wall of the article.

For example the fluoropolymers created by additive processing, in particular non melt-processable fluoropolymers, may have a surface roughness Ra of less than 9, preferably less than 8 or even less than 6 or less than 5.0 μm. Such properties may be useful for articles where bacterial growth has to be prevented or delayed, where very good seals or closure systems are required or generally where fluid transports have to take place. Smooth surface may also be desired for molds.

It has also been found that with the methods provided herein articles having one or more internal walls having at least one straight or curved portion wherein the thickness of the straight or curved portion is at least 0.1 mm, or at least 0.5 mm, preferably at least 1 mm or at least 10 mm may be prepared with fewer internal structural tensions during the heating step. Thus articles with different wall thicknesses or thicker wall thicknesses can be prepared that have an easier and more complete burn out of binder material and/or no or reduced surface distortions.

Fluoropolymer articles of different shapes, designs and functions may be obtained. Also articles comprising the fluoropolymer articles of different designs and functions may be obtained. Examples of articles and fluoropolymer articles include but are not limited to bearings, for example friction bearings or piston bearings, gaskets, shaft seals, ring lip seals, washer seals, O-rings, grooved seals, valves and valve seats, connectors, lids and containers. The article may be medical implants, chemical reactors, screws, cogwheels, joints, bolts, pumps, electrodes, heat exchangers, mixers, turbines, electrical transformers, electrical insulators, extruders or the articles may be components of other articles including the above articles. The articles may be used in application where resistance to acids, bases, fuels, hydrocarbons is required, where non-stick properties are required, where heat resistance is required and combinations thereof.

Preferably, the articles of components thereof contain the shaped fluoropolymer wherein the fluoropolymer has been shaped into structures that contain one or more than one channels, perforations, honeycomb structures, essentially hollow structures and combinations thereof. Such structures may be flat, curved or spherical.

Particularly useful articles that may be created with the methods provided herein or having components created with the methods herein include articles comprising one or more channel for transporting fluids or gases. Examples of articles include but are not limited to housings or seats of a valve, seals, pistons, joints, closure system or components thereof. Particular examples of articles include medical devices or components of a medical device, for example implants, stents etc. and components thereof. Other examples include articles (or components thereof) for processing or storing biological material including food, blood, tissues and pharmaceuticals.

Further examples include molds for articles or components of articles.

The disclosure will now be further illustrated by a list of particular exemplary embodiments. This list of embodiments is intended to further illustrate the present disclosure and it is not intended to limit the present disclosure to the particular embodiments listed.

1. Method of producing a fluoropolymer article comprising
   (i) subjecting a composition comprising fluoropolymer particles either dispersed in a dispersing medium or dissolved in a solvent to additive processing in an additive processing device containing at least one energy source wherein the composition comprises at least one polymerizable binder material capable of binding the fluoropolymer particles to form a layer in a part of the composition that has been exposed to the energy source of the additive processing device;
   (ii) subjecting at least a part of the composition to exposure of the energy source to form a layer by polymerizing the binder material;
   (iii) repeat step (ii) to form a plurality of layers to create an article;
   (iv); at least partially removing the solvent or the dispersing medium from the article by treatment with a supercritical fluid.
2. The method of embodiment 1 wherein the supercritical fluid is supercritical carbon dioxide ($CO_2$).
3. The method of any one of the preceding embodiments wherein the fluoropolymer particles are dispersed and the dispersing medium comprises water.
4. The method of any one of the preceding embodiments wherein the fluoropolymer particles are dispersed and the dispersing medium comprises water, and wherein prior to step (iv) at least some of the water is exchanged with a solvent that is miscible with the supercritical fluid.
5. The method of any one of the preceding embodiments wherein the energy source is selected from electromagnetic irradiation.
6. The method of any one of the preceding embodiments wherein the composition comprises fluoropolymer particles having an average particle size from about 50 to 500 nm (ISO ISO 13321 (1996)).
7. The method of any one of the preceding embodiments wherein the composition is an extrudable paste.
8. The method of any one of the preceding embodiments wherein the fluoropolymer is selected from the group consisting of tetrafluoroethylene homopolymers, tetrafluoroethylene copolymers containing up to 1% by weight of perfluorinated alpha-olefin comonomers, and tetrafluoroethylene copolymers containing more than 1% by weight and up to 30% by weight based on the weight of the polymer of perfluorinated comonomors, partially fluorinated comonomers and non-fluorinated comonomers.
9. The method of any one of the preceding embodiments wherein the fluoropolymer has a melt flow index at 372° C. and 5 kg load (MFI 372/5) of less than 1 g/10 min.

10. The method of any one of the preceding embodiments wherein the fluoropolymer has a melt flow index at 372° C. and 5 kg load (MFI 372/5) of less than 0.1 g/10 min.
11. The method of any one of the preceding embodiments wherein the fluoropolymer has a melt flow index at 372° C. and 5 kg load (MFI 372/5) of from 1 to 50 g/10 min.
12. The method of any one of the preceding embodiments wherein the fluoropolymer is a tetrafluoroethylene copolymer containing more than 1% by weight and up to 30% by weight based on the weight of the polymer of perfluorinated comonomors, partially fluorinated comonomers and non-fluorinated comonomers and wherein the fluoropolymer has a melting point between 260° C. and 315° C.
13. The method of any one of the preceding embodiments wherein the binder material comprises polymerizable unsaturated bonds.
14. The method of any one of the preceding embodiments wherein the binder material comprises polymerizable groups selected from acrylates and methacrylates.
15. The method of any one of the preceding embodiments wherein the binder material has a molecular weight of less than 5,000 g/mole.
16. The method of any one of the preceding embodiments wherein the method further comprises (v) subjecting the article to a heat treatment wherein step (v) is carried out simultaneously with step (iv) or after step (iv).
17. The method of any one of the preceding embodiments wherein the heat treatment involves sintering of the article and wherein the fluoropolymers are selected from tetrafluoroethylene homopolymers, tetrafluoroethylene copolymers containing up to 1% by weight of perfluorinated alpha-olefin comonomers.
18. The method of any one of the preceding embodiments wherein the method further comprises (v) subjecting the article to a heat treatment wherein step (v) is carried out simultaneously with step (iv) or after step (iv) and wherein the heat treatment involves sintering of the article and wherein the fluoropolymers are selected from tetrafluoroethene homopolymers, tetrafluoroethene copolymers containing up to 1% by weight of perfluorinated alpha-olefin comonomers.
19. The method of any one of the preceding embodiments wherein the method further comprises (v) subjecting the article to a heat treatment wherein step (v) is carried out simultaneously with step (iv) or after step (iv) and wherein the heat treatment involves sintering of the article and wherein the fluoropolymer has a melt flow index at 372° C. and 5 kg load (MFI 372/5) of less than 0.1 g/10 min.
20. Method of producing a fluoropolymer article comprising
(i) providing a fluoropolymer article comprising fluoropolymer and one or more binder materials, wherein the article comprises less than 20% by weight based on the total weight of the article of solvent and/or water;
(ii) subjecting the article to a heat treatment to remove or decompose the binder material.
21. The method of embodiment 20, wherein the article comprises at least 20% by weight of fluoropolymer (based on the total weight of the article).
22. The method of embodiment 20 or 21, wherein the article comprises at least 10% by weight of binder material (based on the total weight of the article).
23. The method of any one of the preceding embodiments 20 to 22, wherein the article comprises a binder material comprising polymerized acrylates.
24. The method of any one of the preceding embodiments 20 to 23, wherein the article is obtainable by additive manufacturing using a polymerizable binder material.
25. The method of any one of the preceding embodiments 20 to 24, wherein the article is made up by a composition having a density of less than 2.00 g/cm$^3$, preferably less than 1.99 g/cm$^3$.
26. The method of any one of the preceding embodiments 20 to 25, wherein the article is obtainable by the method of any one of the preceding embodiments 1 to 19.
27. The method of any one of the preceding embodiments 20 to 26, wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomors, partially fluorinated comonomers and non-fluorinated comonomers.
28. The method of any one of the preceding embodiments 20 to 27 wherein fluoropolymer is selected from the group of fluoropolymers having a melt flow index at 372° C. and 5 kg load (MFI 372/5) of less than 1 g/10 min, a melt flow index at 372° C. and 5 kg load (MFI 372/5) of less than 0.1 g/10 min, or a melt flow index at 372° C. and 5 kg load (MFI 372/5) of from 1 to 50 g/10 min.
29. The method of any one of the preceding embodiments 20 to 28 wherein the binder material comprises a material comprising polymerized or polymerizable acrylate groups.
30. The method of any one of the preceding embodiments 20 to 29 wherein the heat treatment comprises sintering and wherein the fluoropolymers are selected from tetrafluoroethene homopolymers, tetrafluoroethene copolymers containing up to 1% by weight of perfluorinated alpha-olefin comonomers.
31. The method of any one of the preceding embodiments 20 to 30 wherein the heat treatment comprises sintering and wherein the fluoropolymers a melt flow index at 372° C. and 5 kg load (MFI 372/5) of less than 1 g/10 min, preferably less than less than 0.1 g/10 min.
32. The method of any one of the preceding embodiments 20 to 31 wherein the article contains less than 10% by weight based on the weight of the article of water, preferably less than 5% by weight.
33. The method of any one of the preceding embodiments 20 to 32 wherein the article has at least one curved surface.
34. The method of any one of the preceding embodiments 20 to 33 wherein the article has at least one internal wall having a thickness of at least 0.5 cm.
35. The method of any one of the preceding embodiments 20 to 34 wherein article has at least one curved surface and wherein the curved surface is part of a shape selected from cylinders, half-cylinders, spheres, half-spheres and combinations thereof.
36. Method of producing a fluoropolymer article comprising
(i) providing a fluoropolymer article containing fluoropolymer, binder material, solvent and/or water;

(ii) at least partially removing the solvent or the dispersing medium from the article by treatment with a supercritical fluid.
37. The method of embodiment 36, wherein the article comprises at least 20% by weight of fluoropolymer (based on the total weight of the article) and from 1 to 50% by weight based in the total weight of binder material and less than 10% by weight, preferably less than 1% by weight of solvent or water.
38. The method of any one of the preceding embodiments 36 to 37, wherein the solvent is miscible with the supercritical fluid.
39. The method of any one of the preceding embodiments 36 to 38, wherein the article comprises at least 10% by weight of binder material (based on the total weight of the article).
40. The method of any one of the preceding embodiments 36 to 39, wherein the article comprises a binder material comprising polymerized acrylates.
41. The method any one of the preceding embodiments 36 to 40, wherein the fluoropolymer article is obtainable by additive manufacturing using a polymerizable binder material.
42. The method of any one of the preceding embodiments 36 to 41, wherein the article is made up of a composition having a density of less than 2.00 g/cm$^3$ or less than 1.95 g/cm$^3$.
43. The method of any one of the preceding embodiments 36 to 42, wherein the article is obtainable by
(i) subjecting a composition comprising fluoropolymer particles either dispersed in a dispersing medium or dissolved in a solvent to additive processing in an additive processing device containing at least one energy source wherein the composition comprises at least one polymerizable binder material capable of binding the fluoropolymer particles to form a layer in a part of the composition that has been exposed to the energy source of the additive processing device;
(ii) subjecting at least a part of the composition to exposure of the energy source to form a layer by polymerizing the binder material;
(iii) repeat step (ii) to form a plurality of layers to create an article.
44. The method of any one of the preceding embodiments 36 to 43, wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomors, partially fluorinated comonomers and non-fluorinated comonomers.
45. The method of any one of the preceding embodiments 36 to 44 wherein fluoropolymer is selected from the group of fluoropolymers having a melt flow index at 372° C. and 5 kg load (MFI 372/5) of less than 1 g/10 min, a melt flow index at 372° C. and 5 kg load (MFI 372/5) of less than 0.1 g/10 min, or a melt flow index at 372° C. and 5 kg load (MFI 372/5) of from 1 to 50 g/10 min.
46. The method of any one of the preceding embodiments 36 to 45 wherein the binder material comprises a material comprising polymerized or polymerizable acrylate groups.
47. The method of any one of the preceding embodiments 36 to 46 wherein the article contains less than 10% by weight based on the weight of the article of water, preferably less than 5% by weight more preferably less than 1% by weight.
48. The method of any one of the preceding embodiments 36 to 47 wherein the article has at least one curved surface.
49. The method of any one of the preceding embodiments 36 to 48 wherein the article has at least one internal wall having a wall strength of at least 0.1 cm.
50. An article comprising a curved surface wherein the curved surface comprises a fluoropolymer and has a surface roughness (Ra) of less than 8 μm, preferably less than 6 μm and more preferably less than 5.5 μm and wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomors, partially fluorinated comonomers and non-fluorinated comonomers.
51. The article of embodiment 50 wherein the fluoropolymer has a melt flow index at 372° C. and 5 kg load (MFI 372/5) of less than 0.1 g/10 min.
52. The article of embodiment 50 wherein the fluoropolymer has a melt flow index at 372° C. and 5 kg load (MFI 372/5) of from Ito 50 g/10 min.
53. The article of embodiment 50 wherein the fluoropolymer is a tetrafluoroethene copolymer containing more than 1% by weight and up to 30% by weight based on the weight of the polymer of perfluorinated comonomors, partially fluorinated comonomers and non-fluorinated comonomers and wherein the fluoropolymer has a melting point between 260° C. and 315° C.
54. The article of any one of the preceding embodiments 50 to 53 wherein the curved surface is the surface a shape selected from cylinders, half-cylinders, spheres, half-spheres and combinations thereof.
55. The article of any one of the preceding embodiments 50 to 54 wherein the curved surface is an interior surface of the article.
56. The article of any one of the preceding embodiments 50 to 55 wherein the curved surface is an exterior surface of the article.
57. The article of any one of the preceding embodiments 50 to 56 wherein the curved surface is the interior surface of a channel for transporting fluids or gases that is or will be exposed to the transporting fluids or gases.
58. The article of any one of the preceding embodiments 50 to 57 wherein the article is selected from housings or seats of a valve, seals, pistons, joints, closure systems or a component thereof.
59. The article of any one of the preceding embodiments 50 to 58 being a medical device or a component of a medical device.
60. The article of any one of the preceding embodiments 50 to 59 being a device for processing or storing biological material including food, blood, tissues and pharmaceuticals.
61. The article of any one of the preceding embodiments 50 to 60 wherein the article contains one or more walls and wherein the curved surface is part of an internal wall or in interior part of an external wall of the article.
62. The article of any one of the preceding embodiments 50 to 61 wherein the article contains one or more walls and wherein the curved surface is part of an internal wall or in interior part of an external wall of the article and the thickness of the walls is at least 0.5 mm, preferably at least 1 mm.
63. The article of any one of the preceding embodiments 50 to 62 wherein the article contains one or more walls and wherein the curved surface is part of an internal wall or in interior part of an external wall of the article and the thickness of the walls is 1 cm or less.
64. The article of any one of the preceding embodiments 50 to 63 being a mold.
65. The article of any one of the preceding embodiments 50 to 64 being obtainable by the method of any one of the preceding embodiments 1 to 19.
66. An article comprising a shaped composition comprising fluoropolymer, binder material and wherein the composition has a density of less than 2.00 g/cm$^3$ and wherein the article contains one or more interior walls.
67. The article of embodiment 66 wherein the interior wall contains a curved surface or is curved.
68. The article of embodiments 66 or 67 wherein the article contains one or more walls and wherein the curved surface is part of an internal wall or in interior part of an external wall of the article and the thickness of the walls is at least 0.1 mm, preferably at least 1 mm.
69. The article of embodiments 66 to 68 wherein the article contains one or more walls and wherein the curved surface is part of an internal wall or in interior part of an external wall of the article and the thickness of the walls is 1 cm or less.
70. The article of embodiments 66 to 69 wherein the composition further comprises from 1 to 30% by weight of water or solvent.

In the present disclosure there is also provided a method of creating a computer-readable three-dimensional model suitable for use in manufacturing the article of any one of embodiments 50 to 70, the method comprising:
(a) inputting data representing the article to a computer; and
(b) using the data to represent the article as a three-dimensional model, the three-dimensional model being suitable for use in manufacturing the article. The inputting of data includes at least one of (a) using a contact-type 3D scanner to contact the article, (b) using a non-contact 3D scanner to project energy onto the article and receive reflected energy, and (c) generating a virtual three-dimensional model of the article using computer-aided design (CAD) software.

In the present disclosure there is also provided a computer-readable three-dimensional model suitable for use in manufacturing the articles of any one of embodiments 50 to 70.

In the present disclosure there is also provided a computer-readable storage medium having data stored thereon representing a three-dimensional model suitable for use in manufacturing the article of embodiments 50 to 70.

The disclosure will now be further illustrated by examples and test methods without intending the disclosure to be limited to the tests and examples below.

Test Procedures
Mechanical Properties:
Mechanical properties (tensile and elongation at break) were measured according to ASTM 1708 at 12.7 mm per minute extension.
Melt Flow Index (MFI):
Melt flow index can be measured with a melt indexer (from Göttfert, Werkstoffprüfmaschinen GmbH, Germany) according to DIN EN ISO 1133 using a 5 kg load and a temperature of 372° C. (MFI 372/5).
Average Particle Size:
Average particle size of polymer particles in a dispersion can be measured by electronic light scattering using a Malvem Autosizer 2c in accordance with ISO 13321 (1996). Particle sizes of solid particles can be analyzed by microscopy and imaging software using the number average (median) as average.
Solid Content:
The solid content (fluoropolymer content) of the dispersions can be determined gravimetrically according to ISO 12086. A correction for non-volatile inorganic salts was not carried out.
Melting Point:
Melting points can be determined by DSC (a Perkin Elmer differential scanning calorimeter Pyris 1) according to ASTM D 4591. 5 mg samples are heated at a controlled rate of 10° C./min to a temperature of 380° C. by which the first melting temperature is recorded. The samples are then cooled at a rate of 10° C./min to a temperature of 300° C. and then reheated at 10° C./min to a temperature at 380° C. The melting point observed at the second heating period is referred to herein as the melting point of the polymer (melting point of the once molten material).
Density of Fluoropolymers:
The density was determined following ASTM D792-13 method A was used but using n-butyl acetate instead of water (and accordingly for the calculation the density of n-butyl acetate at 23° C. was used instead of the density of water at 23° C.). The method can be applied to shaped (and sintered) fluoropolymers and shaped compositions. Samples were taken as obtained, or samples were cut out from an article to determine the density of the composition making up the article.

The SSG density was determined following the procedure of ASTM D4895-15 method A. The SSG density can be used to characterize fluoropolymers used as raw materials or non-sintered fluoropolymers.
Void Content:
The void content (Voi) indicates the volume taken up by voids in a test sample and is therefore an indication of how well the fluoropolymer particles have coalesced. The lower the void content the better the coalescence. The void content is expressed in ‰. It can be calculated according to the equation:

$$\text{Voi (‰)} = 1000 \times (1 - d_g/d_{IR}),$$

wherein $d_g$ is the gravimetrical density of the sample and $d_{IR}$ is the infrared density of the sample. The gravimetrical density can be determined by displacement as described in ASTM D792-13, (referred to in ASTM D792-13 as "density"). Preferably method A of ASTM D792-13 is followed using n-butyl acetate (and the density of n-butyl acetate) as liquid medium in method A. Although ASTM D792-13 requires a sample weight of 1 to 50 g also samples with a smaller weight, can be used measured according to this method. The infrared density ($D_{IR}$) can be determined following a method described in U.S. Pat. No. 3,855,191 to Doughty et al, incorporated herein by reference. Although, the method is described in U.S. Pat. No. 3,855,191 to measure coagulated fluoropolymer powders it can be used in modified form for shaped articles. Accordingly, a test specimen can be prepared by cutting a test probe having a thickness of about 0.5 mm thickness (0.43 to 0.89 mm), for example using a microtome as known in the art. To determine the $d_{IR}$ the test specimen can be examined by IR spectrometry measuring the absorbance at 778 cm$^{-1}$ and 2353 cm$^{-1}$. The percentage (by weight) of amorphous content is then calculated according to the equation:

Wt % (amorphous)=30.26×$A_{778}$/$A_{2353}$+1.73×($A_{778}$/$A_{2353}$)$^2$.

A straight line is drawn of density (g/cm$^3$) over amorphous content (wt %) using the following end points: a density of 1.966 g/cm$^3$ for 100 wt % amorphous content and a density of 2.340 g/cm$^3$ for 0% amorphous content (100% crystallinity). The infrared density of the sample can then be determined by finding the corresponding density for the given value of Wt % (amorphous), either graphically by locating the Y-value in the straight line or by calculating it using the slope of the straight line.

The same test specimen is then measured to determine its gravimetric specific density (dg) (according to ASTM D792-13, method A) in butyl acetate and the void content is then calculated.

Stretch Void Index (SVI):

This method compares the specific density of a fluoropolymer sample under force. The method is described in EN ISO 12086-2-2006 (D). The SVI is calculated by the difference of the density of samples in unstretched form and stretched form multiplied by one thousand. A test sample is prepared from the article. The sample can have the dog-bone shape and dimensions as described in EN ISO 12086-2-2006 (D). The dog-bone test strip according to the norm has a minimum length of 38 mm. For smaller samples, i.e. articles having a length of less than 1 cm, samples of the same shape but of a minimum length of 10 mm or 5 mm or 0.5 mm can be prepared and the width can then be adjusted accordingly to give a dog-bone shape. The thickness of the sample can be between 0.125 and 1.5 mm as described in the norm. The sample can be used as is, sintering as described in the norm is not carried out.

The density of the test sample can be determined in butyl acetate as described above. The test sample is then stretched (elongated) in a tensile tester by 50%, 100%, preferably 200% at a speed of 5 mm+/−1 mm/min. Then the density of the stretched sample is determined as described above and the SVI is calculated. SVI=($d_g$−$d_{g(stretched)}$)×1000.

While the SVI values differ depending on the elongation (stretching) of the sample, the ratio of SVIy/SVIx of the samples should remain constant over the degree of stretching (stretching between 50% and 440% at speed of 5.0 mm/min) and should thus be independent from the degree of stretching. SVIy is the SVI measured from samples cut in the y-direction, i.e. across the extrusion direction. SVIx is the SVI determined from samples cut in the x-direction, i.e. along the extrusion direction. The SVIy and SVIx samples were taken from the same product sample—just cut in X or Y direction of the sample, i.e. orthogonal to each other). The ratio of SVIy/SVIx ratio for an ideal isotropic material would be 1.00. The deviation from this value corresponds to the % of anisotropy of the sample. For example, a SVY/SVIx ratio of 1.12 corresponds to an anisotropy of 12%.

Degree of Orientation (Polarized Light Microscopy):

Test samples can be analyzed for the degree of oriented structure present in the samples by means of polarized light microscopy. Herein, the light transmission of the sample being placed at different angles to the polarization plane of the incident light is quantified. For this purpose, a Universal Axioplan microscope (from Carl Zeiss Microscopy GmbH, Oberkochen, Germany) can be used in transmitted light mode (2.5 magnification), the instrument is further equipped with a polarization filter and a with lambda plate (serial part #453656 from Carl Zeiss Microscopy GmbH). Color images can be taken by a digital camera (Sony MC3250P 3CCD Color Video Cam) and an image software (AxioVs40 from Carl Zeiss Vision) can be utilized. Test samples can be used having a thicknesses of from 50 μm to 1,600 μm. Results appear to be independent of the sample thickness as long as the sample is still translucent enough to allow transmission of light for taking measurements. The fixed samples are rotated clockwise by rotating the sample plate in z-direction by an angular step size of 10° such that the sample is placed at different angles with respect to the polarized light and images can be taken at each 10° step until a full revolution was completed (sample rotation by 360°).

The degree of transmission indicated by the brightness of the microscope images can be recorded at different angles to the polarization plane of the incident light. To quantify the brightness, the colored images can be analyzed for the RGB (red, green, blue) value (RGB standard) of each picture. In the RGB standard each of the primary color red, blue and green is given by a value in between 0 and 255; wherein 0 indicates the least intensity and 255 the highest intensity. For example, the RGB of 0/0/0 represents the color black and the RGB of 255/255/255 represents the brightest white. The colored images can be analyzed for the RGB codes using the image processing software provided by the instrument supplier (AxioVs40 from Carl Zeiss Vision). Alternatively, any other commercial graphic processing software can be used (e.g. Corel Photo-Paint X5 from Corel Corporation; Ottawa, Canada). The RGB values for each image can be added up to give a single number. For example if the RGB value for an image obtained at a specific angle is (50/100/255), the added RGB value is 405 (50+100+255). This procedure can be conducted for all images taken at angles between 0 and 360° of sample rotation in the z-plane.

In case of samples being highly orientated, discernible differences in the brightness of the transmitted polarized light (sum of the RGB values) are observed in the microscope pictures recorded at different angles. The highest added RGB value (vB) and the lowest added RGB value (vL) were determined, and the ratio of vB/vL was calculated. The brightness contrast between the images was monitored by a change in the added RGB values between the various images, and a high brightness contrast is indicative for an orientation within the sample. The degree of orientation was quantified by the brightness contrast given by the ratio of vB/vL. A value of vB/vL=1.10 represents an anisotropy of 10% or a degree of oriented material in the sample of 10%. On the other hand, a brightness contrast being close to vB/vL=1.00 is indicative for the absence of optical anisotropy within the sample. For such a material with no orientation, the degree of oriented materials is 0.

Surface Roughness Procedure

A 3D-printed sample was placed under a Keyence VKX high resolution scanning laser microscope (Keyence Corporation of America, Itasca, IL 60143). The laser scanning function was used to create surface profil and scan settings were automatically optimized for each sample by the software. By using the microscope an area on the sample in the shape of a square and having a size of 1.0 mm by 1.0 mm the sample is selected. For a curved surface that area should cover the apex of the curved surface and the surface is viewed directly over the apex. The height of the surface of the sample is then measured along a line going across the article, by starting from the left lower corner of the selected square to the top right corner of the square and across the apex if the sample is curved. This line was then plotted against a best fit curve using the fitting software provided with the microscope to match the surface profile of the scanned area. The average surface roughness ($R_a$) was determined by the software and is the arithmetic mean roughness.

EXAMPLES

Example 1 (Comparison of Surface Roughness)

An article containing a dome shaped feature (height about 1 mm, basis about 1 mm by 1 mm) was prepared from a PTFE dispersion with acrylate binders by 3D printing (produced by stereolithography (vat polymerization) using a PICO 2 "3D printer" (energy source: 385 nm LED) from ASIGA Anaheim Hills, California, USA) followed by heat drying and sintering and compared to the same feature made by conventional machining.

The article was of white appearance and had the shape as specified by the electronic file. The surface roughness (Ra) of the article was determined to be 4.99 μm. The same dome shaped article was prepared from a PTFE billet but using conventional machining (CNC). The surface roughness was found to be 9.99 μm.

Example 2

3D-printable compositions were made by weighing PTFE dispersion (320, 07 g; solid content 58% wt, average particle size: 190 nm, fluorinated emulsifier below 50 ppm, 6% based on PTFE content of non-ionic aliphatic stabilizing emulsifier) into a bottle and then agitating by lab bottle roller. In a separate bottle the binder material (acrylates SR415 from Sartomer Americas, Exton, PA, USA, 28 g and SR433 from Sartomer Americas, Exton, PA, USA and water (80 g) were mixed and subsequently photo initiator (BHT from Sigma-Aldrich, St Louis, MO, USA (0.46 g), inhibitor, and optical brightener (Benetex OB-M1 from Mayzo, Inc. Suwanee, GA, USA(0.23 g)) were weighed, added, and then agitated by lab bottle roller. Upon complete mixing, the binder mixture was added slowly to the dispersion and the combined solution to form a complete printable formulation which was then agitated by lab bottle roller for a minimum 30 minutes prior to use. The printable formulation was stored in its bottle under continuous rolling until it was poured into the printer vat.

Two solid model (CAD) files were prepared: a tensile dogbone specimen as described by ASTM 1708 and a flat rectangular sheet 15 mm by 38 mm by 1.5 mm thick, both uniformly scaled up (along x, y, and z coordinates) by a factor of 1.47. These files were loaded into Rapidshape build composer software, NetFabb, and a build command file containing multiple of each wherein the sheets and dogbones were oriented flat on the buildplate was produced and transferred to a Rapidshape HA 40 SLA type 3D printer. The printable solution was poured into a clean vat and the printer was equipped with a roughened glass build plate.

Following each print aquagel samples were rinsed in deionized water to remove uncured composition, residual surface liquids blown off by light pressurized nitrogen gas stream, and post cured under UV light for 30 seconds (Dymax light curing system Model 2000 Flood with a 400 Watt EC power supply).

The aquagels were submerged in 2 sequential soaks for a minimum of one day each in ethanol (obtained as 200 proof) to exchange water in the aquagels with ethanol. After the exchange of dispersing medium to ethanol the articles were subjected to extraction with supercritical carbon dioxide extraction to remove ethanol and to from the aerogel. Preparation for supercritical $CO_2$ extraction was performed by transferring solvent exchanged aquagels from their second ethanol bath into metal carriers. In order to minimize ethanol evaporative drying, samples were periodically wetted with ethanol during the aquagel transfer. When carriers were loaded they were then placed into the extraction chamber. The supercritical extraction was performed using a 10-L laboratory-scale supercritical fluid extractor unit designed by and obtained from Thar Process, Inc., Pittsburgh, PA, USA. The PTFE-based gels were mounted in a stainless steel rack. After the extractor vessel lid was sealed in place, liquid carbon dioxide was pumped by a chilled piston pump (set point: −8.0° C.) through a heat exchanger to heat the $CO_2$ to 50° C. and into the 10-L extractor vessel until an internal pressure of 13.3 MPa was reached. At these conditions, carbon dioxide is supercritical. Once the extractor operating conditions of 13.3 MPa and 50° C. were met, a heated needle valve regulated the pressure inside the extractor vessel, and flowed downstream into a 5-L cyclone separator vessel that was maintained at room temperature and pressure less than 5.5 MPa, where the extracted ethanol and gas-phase $CO_2$ were separated and collected throughout the extraction cycle. Supercritical carbon dioxide ($scCO_2$) was pumped continuously through the 10-L extractor vessel for 3 hours from the time the operating conditions were achieved. After the 3-hour extraction cycle, the extractor vessel was vented into the cyclone separator over 1 hour from 13.3 MPa to atmospheric pressure at 50° C. before the lid was opened and the stainless steel rack containing the dried aerogels was removed.

Aerogels were placed on a bed of ceramic (La Zr Al oxide) beads in aluminum pans for burnout and sintering in a Despatch Industries Model RAF 1-42-2E programmable air circulating oven to heating comprising a first heating step at temperatures between 225 and 275° C. and sintering steps at 325 and 380° C. after which the samples were allowed to reach room temperature.

The samples were tested for mechanical properties based on ASTM 1708 tested at 12.7 mm per minute extension. Tensile Pressure at break and Elongation at break were recorded for each sample and averaged (eight samples were prepared). The samples had a tensile pressure at break of 23.9 (MPa) and an elongation at break of 258%.

Example 3

A solid model (CAD) file of a test artifact part with several wall thicknesses was created. The rectangular article had a length of 49 mm and a width of 30 mm. It had a circumferential wall of a thickness of 1.5 mm along its length. The circumferential walls along the width had a thickness of 5 and 10 mm, respectively. The article further had a series of internal walls arranged parallel to the width of the article and extending along the width of the article connecting the two circumferential walls along the length of the article. These internal walls had different thicknesses (1.5 mm, 1.0 mm, 3.0 mm, 3.5 mm and were spaced at a distance of 5.0 mm).

The CAD file was loaded into ASIGA COMPOSER build composing software and a build command containing a single part and wherein the thickness block was placed flat on the build platform (downward face in the image contacting the buildplate) was generated and transferred to ASIGA PICO 2 HD SLA type 3D printer. A printable solution (essentially the same as that of example 2 but with slightly different ratios) was poured into a clean vat and the printer was equipped with its standard Asiga buildplate (manually roughened, metallic). The articles were prepared as described above in example 2 (except that in addition to solvent exchange with ethanol another solvent exchange with carbitol was carried out (one day soaking in carbitol). Solvents were removed by extraction with supercritical $CO_2$, and the articles were then subjected to heat treatment and sintering as described in example 2.

The resulting articles were white. Three out of four specimen showed no distortions and only one specimen showed minor structural distortions.

Example 4 (Comparative)

Example 3 was repeated but without solvent exchange and $CO_2$ extraction. Instead drying at ambient conditions was carried out for 7 days in an Espec SH-241 bench-top type Temperature & Humidity Chamber, followed by the same heat and sintering treatment as used in example 2. After this treatment all specimen showed incomplete burn out (none of the specimen was completely white). Several specimen showed minor structural distortions.

The invention claimed is:

1. A method of producing a fluoropolymer article comprising:
    (i) providing a fluoropolymer article containing at least 20% by weight of a fluoropolymer based on the total weight of the article, a binder material, and an organic solvent, wherein the fluoropolymer is selected from the group consisting of fluoropolymers having a melt flow index at 372° C. and 5 kg load (MFI 372/5) of less than 1 g/10 min, wherein providing the fluoropolymer article comprises either:
        (a) subjecting a composition comprising fluoropolymer particles either dispersed in a dispersing medium comprising the organic solvent or dissolved in the organic solvent to additive processing in an additive processing device containing at least one energy source, wherein the composition comprises at least one polymerizable binder material capable of binding the fluoropolymer particles to form a layer in a part of the composition that has been exposed to the energy source of the additive processing device;
        (b) subjecting at least a part of the composition to exposure of the energy source to form a layer by polymerizing the binder material; and
        (c) repeating the step (b) to form a plurality of layers to create the fluoropolymer article;
        or
        (1) subjecting a composition comprising fluoropolymer particles dispersed in a dispersing medium comprising water or a solvent immiscible with a supercritical fluid to additive processing in an additive processing device containing at least one energy source, wherein the composition comprises at least one polymerizable binder material capable of binding the fluoropolymer particles to form a layer in a part of the composition that has been exposed to the energy source of the additive processing device;
        (2) subjecting at least a part of the composition to exposure of the energy source to form a layer by polymerizing the binder material;
        (3) repeating the step (2) to form a plurality of layers to create the article; and
        (4) exchanging the water or the solvent immiscible with the supercritical fluid with the organic solvent that is miscible with the supercritical fluid to create the fluoropolymer article; and
    (ii) at least partially removing the organic solvent from the article by treatment with a supercritical fluid, wherein the organic solvent is miscible with the supercritical fluid.

2. The method of claim 1, wherein the organic solvent is an alcohol.

3. The method of claim 1, wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomers, partially fluorinated comonomers and non-fluorinated comonomers.

4. The method of claim 1, wherein the fluoropolymer is selected from the group consisting of the fluoropolymers having a melt flow index at 372° C. and 5 kg load (MFI 372/5) of less than 0.1 g/10 min.

5. The method of claim 1, wherein the binder material comprises a material comprising polymerizable acrylate groups.

6. The method of claim 1, wherein the article contains less than 10% by weight based on the weight of the article of water.

7. An article made by the method of claim 1, the article comprising a curved surface wherein the curved surface comprises the fluoropolymer and has a surface roughness (Ra) of less than 8 µm and wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomers, partially fluorinated comonomers and non-fluorinated comonomers.

8. The article of claim 7 wherein the fluoropolymer is a tetrafluoroethene copolymer containing more than 1% by weight and up to 30% by weight based on the weight of the polymer of perfluorinated comonomers, partially fluorinated comonomers and non-fluorinated comonomers and wherein the fluoropolymer has a melting point between 260° C. and 315° C.

9. The article of claim 7 wherein the curved surface is a surface of a shape selected from the group consisting of cylinders, half-cylinders, spheres, half-spheres and combinations thereof.

10. The article of claim 7 wherein the curved surface is an interior surface of a channel for transporting fluids or gases that is or will be exposed to the transporting fluids or gases.

11. The article of claim 7 wherein the article is selected from the group consisting of molds, housings or seats of a valve, seals, pistons, joints, closure systems and a component thereof.

12. The article of claim 7 being a device for processing or storing biological material comprising food, blood, tissues or pharmaceuticals.

* * * * *